(12) United States Patent
Williams et al.

(10) Patent No.: US 8,236,422 B2
(45) Date of Patent: Aug. 7, 2012

(54) DIAZONIUM FUNCTIONALIZED NANOPARTICLES AND METHODS FOR BINDING NANOPARTICLES TO METALLIC SURFACES

(75) Inventors: Federico Jose Williams, Buenos Aires (AR); Maria Joselevich, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 729 days.

(21) Appl. No.: 12/330,378

(22) Filed: Dec. 8, 2008

(65) Prior Publication Data

US 2009/0181240 A1 Jul. 16, 2009

Related U.S. Application Data

(60) Provisional application No. 61/012,363, filed on Dec. 7, 2007.

(51) Int. Cl.
  *B32B 27/00* (2006.01)
  *D06N 3/12* (2006.01)
  *C07C 245/00* (2006.01)
  *C07C 245/12* (2006.01)

(52) U.S. Cl. ........ 428/407; 428/143; 428/144; 428/147; 428/403; 428/404; 534/558

(58) Field of Classification Search .................... None
  See application file for complete search history.

(56) References Cited

U.S. PATENT DOCUMENTS 5,194,279 A * 3/1993 Okel ........................ 426/330
2005/0034629 A1 2/2005 Belmont

FOREIGN PATENT DOCUMENTS

| WO | WO 96/18690 A1 | 6/1996 |
| WO | WO 2005/012172 A2 | 2/2005 |
| WO | WO 2006/125589 A1 * | 11/2006 |

OTHER PUBLICATIONS

Adenier, A., Bernard, M.C., Chehimi, M.M., Cabet-Deliry, E., Desbat, B., Fagebaume, O., Pinson, J., Podvorica, F. "Covalent Modification of Iron Surfaces by Electrochemical Reduction of Aryldiazonium Salts." J. Am. Chem. Soc. 123 (2001): 4541-4549.*

Bahr, J.L., Yang, J., Kosynkin, D.V., Bronikowski, M.J., Smalley, R.E., Tour, J.M. "Functionalization of Carbon Nanotubes by Electrochemical Reduction of Aryl Diazonium Salts: A Bucky Paper Electrode." J. Am. Chem. Soc. 123 (2001): 6536-6542.*

(Continued)

*Primary Examiner* — Alicia Chevalier
*Assistant Examiner* — Thomas Mangohig
(74) *Attorney, Agent, or Firm* — Knobbe Martens Olson & Bear, LLP

(57) ABSTRACT

In one embodiment, a functionalized particle includes a n inorganic particle with diazonium functional group attached. In some embodiments, the largest dimension of the inorganic particle ranges between about 10 nm and 1000 μm. In another embodiment, a substrate with a hydrophobic surface includes a substrate, and a first plurality of inorganic particles with at least one diazonium functional group attached to the substrate. The largest dimension of the first plurality of inorganic particles ranges between about 10 nm and 1000 μm. One embodiment includes a second plurality of particles with at least one phenol functional group attached to the inorganic particle. In a further embodiment, a fluorinated functional group is attached to the second plurality of particles. In some embodiments, the material has a hydrophobic surface with a water contact angle greater than about 150°.

24 Claims, 16 Drawing Sheets

OTHER PUBLICATIONS

Dyke, C.A., Tour, J.M. "Unbundled and Highly Functionalized Carbon Nanotubes from Aqueous Reactions." Nano Letters 3.9 (2003): 1215-1218.*

Pan, Q., Wang, M., Chen, W. "Hydrophobization of Metal Surfaces by Covalent Grafting of Aromatic Layer via Aryldiazonium Chemistry and Their Application in the Fabrication of Superhydrophobic Surfaces." Chem. Lett. 36.11 (2007): 1312-1313.*

Stewart, M.P., Maya, F., Kosynkin, D.V., Dirk, S.M., Stapleton, J.J., McGuiness, C.L., Allara, D.L., Tour, J.M. "Direct Covalent Grafting of Conjugated Molecules onto Si, GaAs, and Pd Surfaces from Aryldiazonium Salts." J. Am. Chem. Soc. 126 (2004): 370-378.*

Merrington, J., James, M., Bradley, M. "Supported diazonium salts-convenient reagents for the combinatorial synthesis of azo dyes." Chem Commun. (2002): 140-141.*

Waje, M. M., Wang, X., Li, W., Yan, Y. "Deposition of platinum nanoparticles on organic functionalized carbon nanotubes grown in situ on carbon paper for fuel cells." Nanotechnology 16 (2005): S395-S400.*

Abad, J. et al., "Functionalization of Thioctic Acid-Capped Gold Nanoparticles for Specific Immobilization of Histidine-Tagged Proteins," JACS Articles, Mar. 19, 2005, 127, pp. 5689-5694.

Adenier, A. et al., "Covalent Modification of Iron Surfaces by Electrochemical Reduction of Aryldiazonium Salts," J. Am. Chem. Soc., Apr. 21, 2001, 123, pp. 4541-4549.

Adenier, A. et al., "Grafting of Nitrophenyl Groups on Carbon and Metallic Surfaces without Electrochemical Induction," Chem. Mater, 2005, 17, pp. 491-501. Supplemental Information Section, pp. 1-4.

Adenier, A. et al., "Study of the Spontaneous formation of organic layers on carbon and metal surfaces from diazonium salts," Surface Science, 600, 2006, pp. 4801-4812.

An Y. et al., "Preparation and self-assembly of carboxylic acid-functionalized silica," Journal of Colloid and Interface Science, 2007, 311, pp. 507-513.

Beck, C. et al., "Covalent Surface Functionalization and Self-Organization of Silica Nanoparticles," Angew, Chem. Int. Ed., 1999, vol. 38, No. 9, pp. 1297-1300.

Ben-Ali, S. et al., "Bioelectrocatalysis with modified highly ordered macroporous electrodes," Journal of Electroanalytical Chemistry, 2005, 579, pp. 181-187.

Bernard, M et al., Organic Layers Bonded to Industrial, Coinage, and Noble Metals through Electrochemical Reduction of Aryldiazonium Salts, Chem. Mater. 2003, 15, pp. 3450-3462.

Bhat, R. et al., "Controlling the assembly of nanoparticles using surface grafted molecular and macromolecular gradients," Nanotechnology, 14, 2003, pp. 1145-1152.

Bhuniya, S. et al., "Biotin-Amino Acid Conjugates: An Approach Toward Self-Assembled Hydrogelation," Organic Letters, 2005, vol. 7, No. 9, pp. 1741-1744.

Brant, P. et al., "X-Ray Photoelectron Spectra of Aryldiazo Derivatives of Transition Metals," Journal of Organometallic Chemistry, 1976, 120, pp. C53-C57.

Brooksby, P. et al., "Electrochemical and Atomic Force Microscopy Study of Carbon Surface Modification via Diazonium Reduction in Aqueous and Acetonitrile Solutions," Langmuir, 2004, 20, pp. 5038-5045.

Burns, F.C. et al., "X-ray Photoelectron Spectroscopy of Cadmium Arachidate Monolayers on Various Metal Surfaces," J. Phys. Chem., 1982, 86, pp. 5123-5127.

Chiang, C.H. et al., "Magic-Angle Cross Polarization Carbon 13 NMR Study of Aminosilane Coupling Agents on Silica Surfaces," Journal of Colloid and Interface Science, Mar. 1982, vol. 86, No. 1, pp. 26-34.

Combellas, C. et al., "Spontaneous Grafting of Iron Surfaces by Reduction of Aryldiazonium Salts in Acidic or Neutral Aqueous Solution. Application to the Protection of Iron against Corrosion," Chem. Matter., 2005, 17, pp. 3968-3975.

Corgier, B., "Diazonium-Protein Adducts for Graphite Electrode Microarrays Modification: Direct and Addressed Electrochemical Immobilization," JACS Articles, Dec. 2, 2005, 127, pp. 18328-18332.

De Villeneuve, C.H. et al., "Electrochemical Formation of Close-Packed Phenyl Layers on Si(111)," J. Phys. Chem. B, 1997, 101, pp. 2415-2420.

Delmar, M. et al., "Covalent Modification of Carbon Surfaces by Grafting of Functionalized Aryl Radicals Produced from Electrochemical Reduction of Diazonium Salts," J. Am. Chem. Soc. 1992, 114, pp. 5883-5884.

El Rassy, H. et al., "NMR and IR spectroscopy of silica aerogels with different hydrophobic characteristics," Journal of Non-Crystalline Solids, 2005, 351, pp. 1603-1610.

Evans, S.D. et al., "Vapor sensing using hybrid organic-inorganic nanostructured materials," J. Mater. Chem., 2000, 10, pp. 183-188.

Gervais, M. et al., "Surface Analysis of Lipopeptides Using X-Ray Photoelectron Spectroscopy," Journal of Colloid and Interface Science, Sep. 1988, vol. 125, No. 1, pp. 146-154.

Gu, G et al., "Fabrication and characterization of transparent superhydrophobic thin films based on silica nanoparticles," Applied Physics A 83, Materials Science & Processing, 2006, pp. 131-132.

Grunze M. et al., "Adhesion of Vapour Phase Deposited Ultra-Thin Polyimide Films on Polycrystalline Silver," Surface Science, 1988, 204, pp. 183-212, North-Holland, Amsterdam.

Hamdy, A.S., "Advanced nano-particles anti-corrosion ceria based sol gel coatings for aluminum alloys," Materials Letters, 2006, 60, pp. 2633-2637.

Haynes, C.L., "Nanosphere Lithography: A Versatile Nanofabrication Tool for Studies of Size-Dependent Nanoparticle Optic," J. Phys. Chem. B, 2001, vol. 105, No. 24, pp. 5599-5611.

Hurley, B.L. et al., "Covalent Bonding of Organic Molecules to Cu and Al Alloy 2024 T3 Surfaces via Diazonium Ion Reduction," Journal of Electrochemical Society, 151 (5), 2004, pp. B252-B259.

Jones, T.S. et al., "The interaction of the polyimide precursors PMDA (1,2,4,5-benzenetetracarboxylicanhydride) and $m$-PDA (1,3-phenylenediamine) with Ni(110)," J. Vac. Sci. Technol., 1990, A 8 (3), pp. 2370-2375.

Kariuki, J. et al., "Formation of Multilayers on Glassy Carbon Electrodes via the Reduction of Diazonium Salts," Langmuir, 2001, 17, pp. 5947-5951.

Kizil, M. et al., "DNA Cleavage Activity of Diazonium Salts: Chemical Nucleases," Turk J Chem, 2003, 27, pp. 539-544.

Koval'Chuck, E. et al., "Mechanism of the benzenediazonium tetrafluoroborate thermolysis in the solid state," Thermochimica Acta, 444, 2006, pp. 1-5.

Ma, Y. et al., "Buildup of gold nanoparticle multilayer thin films based on the covalent-bonding interaction between boronic acids and polyols," Journal of Colloid and Interface Science, 295, 2006, pp. 583-588.

Mirkhalaf, F. et al., "Synthesis of Metal Nanoparticles Stabilized by Metal-Carbon Bonds," JACS Communications, May 17, 2006, 128, pp. 7400-7401.

Oubaha, M. et al., "Spectroscopic characterization of sol-gel organo-siloxane materials synthesized from aliphatic and aromatic alcoxysilanes," Journal of Non-Crystalline Solids, 2005, 351, pp. 2122-2128.

Pinson, J. et al., "Attachment or organic layers of conductive or semiconductive surfaces by reduction of diazonium salts," Chemical Society Review, Feb. 23, 2005, 34, pp. 429-439.

Polsky, R. et al., "Diazonium-Functionalized Horseradish Peroxidase Immobilized via Addressable Electrodeposition: Direct Electron Transfer and Electrochemical Detection," Langmuir, 2007, 23, pp. 364-366.

Rogozhina, E. V. et al., "Carboxyl functionalization of ultrasmall luminescent silicon nanoparticles through thermal hydrosilylation," Journal of Materials Chemistry, Jan. 2006, 16, pp. 1421-1430.

Schiestel, T. et al., "Controlled Surface Functionalization of Silica Nanospheres by Covalent Conjugation Reactions and Preparation of High Density Streptavidin Nanoparticles," Journal of Nanoscience and Nanotechnology, 2004, vol. 4, No. 5, pp. 504-511.

Stober, W. et al., "Controlled Growth of Monodisperse Silica Spheres in the Micron Size Range," Journal of Colloid and Interface Science, 1968, 26, pp. 62-69.

Strohmeier, B.R., "Surface Characterization of Aluminum Foil Annealed in the Presence of Ammonium Fluoborate," Applied Surface Science, 1989, 40, pp. 249-263, North-Holland.

Tagliazucchi, M. et al., "Effect of Acid-Base Equilibria on the Donnan Potential of Layer-by-Layer Redox Polyelectrolyte Multilayers," J. Phys. Chem. B, 2007, 111, pp. 8105-8113.

Thornburg, D.M. et al., "Cleavage of NH Bonds by Active Oxygen on Ag(110)," Surface Science, 1990, 226, pp. 61-76, North-Holland.

Tognarelli, D.J. et al., "Covalently Networked Monolayer-Protected Nanoparticle Films," Langmuir, 2005, 21, pp. 11119-11127.

Van Blaaderen, A., "From the de Broglie to Visible Wavelengths: Manipulating Electrons and Photons With Colloids," MRS Bulletin, Oct. 1998, 23, pp. 39-43.

Van Blaaderen, A., "Particle morphology and chemical microstructure of colloidal silica spheres made from alkoxysilanes," Journal of Non-Crystalline Solids, 1992, 149, pp. 161-178, North-Holland.

Van Blaaderen, A., "Synthesis and Characterization of Monodisperse Colloidal Organo-silica Spheres," Journal of Colloid and Interface Science, 1993, 156, pp. 1-18.

Varghese, B. et al., "Size Selective Assembly of Colloidal Particles on a Template by Directed Self-Assembly Technique," Langmuir, 2006, 22, pp. 8248-8252.

Wang W. et al., "Effect of anionic surfactants on synthesis and self-assembly of silica colloidal nanoparticles," Journal of Colloid and Interface Science, 313, 2007, pp. 169-173.

Zhai, L., et al., "Stable Superhydrophobic Coatings from Polyelectrolyte Multilayers," Nano Letters, 2004, vol. 4, No. 7, pp. 1349-1353.

Zhang, D., et al., "Silica-nanoparticle-based interface for the enhanced immobilization and sequence-specific detection of DNA," Anal Bioanal Chem., 2004, 379, pp. 1025-1030.

Zhang, G, et al., "Fabrication of Superhydrophobic Surfaces from Binary Colloidal Assembly," Langmuir, 21, 2005, pp. 9143-9148.

Zirbs, R. et al., "Direct Assembly of Au Nanoparticles onto Planar Surfaces via Multiple Hydrogen Bonds," Langmuir, 2005, 21, pp. 8414-8421.

\* cited by examiner

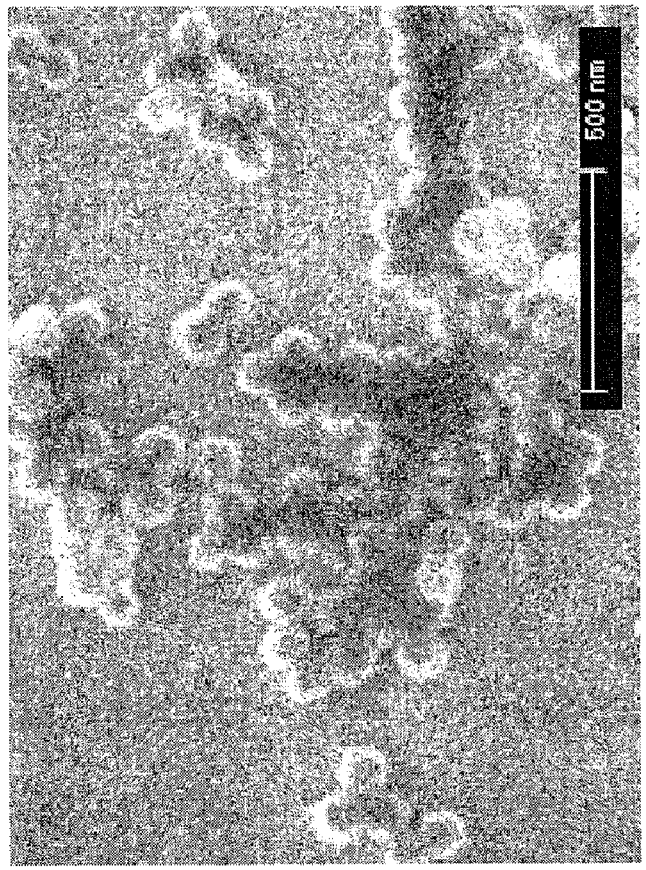
FIG. 12

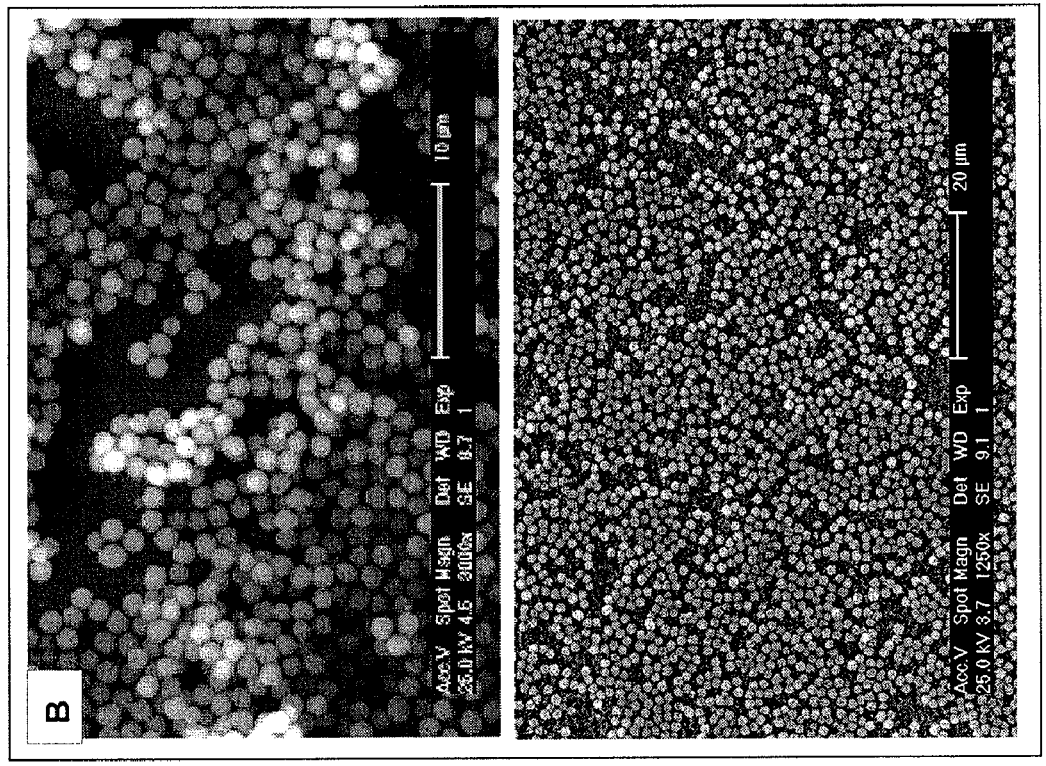
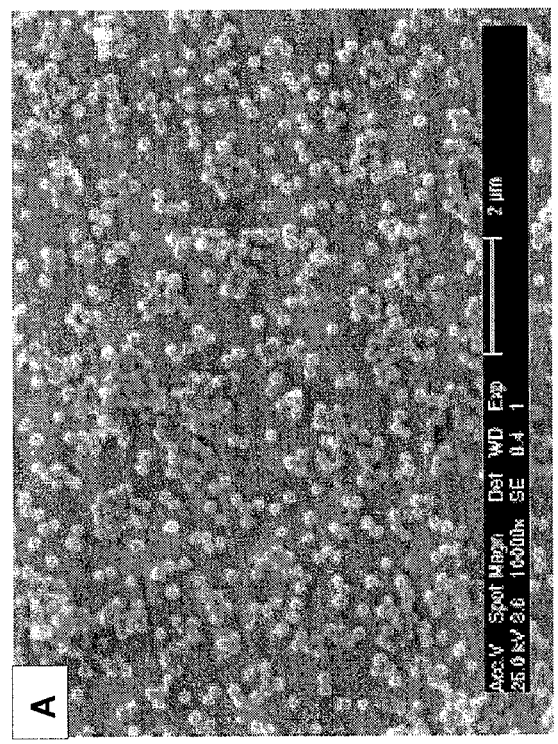
FIG. 13

| Sample | 1 | 2 | 3 | 4 |
|---|---|---|---|---|
| Surface morphology | Clean steel surface | Surface morphology A in Figure 14 | Surface morphology C in Figure 14 | Surface morphology C in Figure 14 |
| Photo image | 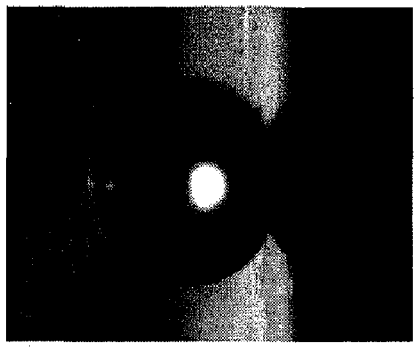 | 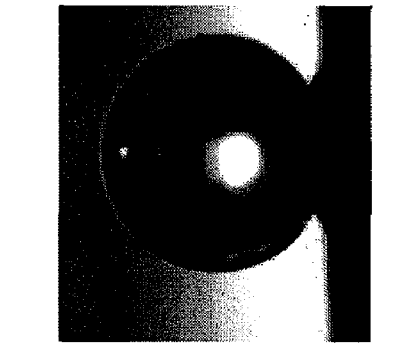 | 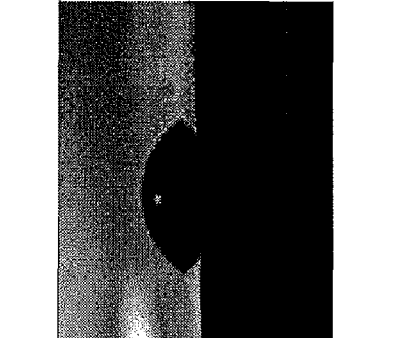 | 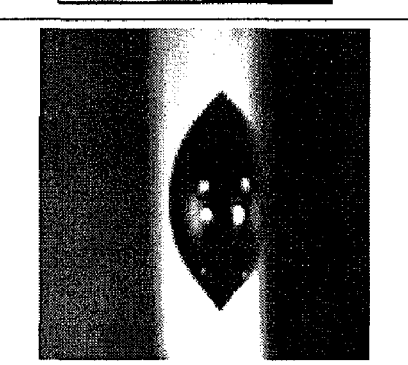 |
| Water contact angle | CA = 22° | CA = 70° | CA = 155° | CA = 163° |
FIG. 15

DIAZONIUM FUNCTIONALIZED NANOPARTICLES AND METHODS FOR BINDING NANOPARTICLES TO METALLIC SURFACES

CROSS-REFERENCE TO RELATED APPLICATION

This application claims the benefit of U.S. Provisional Application No. 61/012,363, filed Dec. 7, 2007, the entirety of which is hereby incorporated by reference.

BACKGROUND OF THE INVENTION

1. Field of the Invention

Embodiments of the present disclosure relate to functionalized particles, and, in particular, to diazonium functionalized silica particles for use in binding to metallic or semiconductor surfaces. Further embodiments relate to methods for bonding nanoparticles to metallic surfaces in order to form a desired effect, and the structures formed as a result of such bonding. Further embodiments relate to surfaces treated with diazonium functionalized particles that possess elevated levels of hydrophobicity.

2. Description of the Related Art

Metal and semiconductor surfaces are frequently modified with particles in order to add new properties and functions. For example, surface attachment of particles may be an important step in the construction of devices such as biosensors, photonic band gap materials, catalysts, and colloidal lithography.

The stability and performance of the surfaces depend, at least in part, on the binding strength between the particles and the substrate. As a result, various techniques have been developed to bind particles to metal or semiconductor surfaces. However, most of these techniques only result in weak particle surface adsorption. Furthermore, these processes are often complex, requiring many steps, which increase the time, resources, and costs of producing particle-functionalized surfaces.

In particular, particles can be covalently bonded to substrates by the modification of both the substrate and the particle surfaces with functional organic groups that, in a latter step, react with each other. Although this approach to increase the strength of the particle-surface interaction is possible, it requires three controlled steps of (i) particle modification, (ii) surface modification, and (iii) particle and surface attachment.

Difficulties in modifying metal and semiconductor surfaces, such as weak particle surface adsorption and complex processes, show the continued need for improved systems and methods for bonding particles to metal surfaces.

SUMMARY OF THE INVENTION

Embodiments of the present disclosure provide systems and methods for diazonium functionalized particles and the attachment of diazonium functionalized particles to substrates. Beneficially, such diazonium functionalized particles are suitable for attachment to substrates without modification of the substrate surface prior to attachment. In certain embodiments, the diazonium functionalized particles have varying sizes, including, but not limited to, particles having mean diameters on the order of nanometers and microns.

In one embodiment, a functionalized particle includes an inorganic particle and a diazonium functional group attached to the inorganic particle. In some embodiments, the largest dimension of the inorganic particle ranges between about 10 nm and 100 µm. In certain embodiments, the inorganic particle is selected from the group including silica, titania, and zirconia. In some embodiments, the largest dimension of the inorganic particle is between about 100 nm and 1000 nm. In other embodiments, a largest dimension of the inorganic particle is between about 1 µm and 100 µm. In one embodiment, diazonium-functionalized particles are used for making hydrophobic surfaces.

In another embodiment, a material is provided including a substrate and a first plurality of inorganic particles with at least one diazonium functional group attached to the substrate. In some embodiments, the largest dimension of the first plurality of inorganic particles is between about 10 nm and 100 µm. In certain embodiments, the first plurality of inorganic particles is selected from the group including silica, titania, and zirconia. In some embodiments, the largest dimension of the first plurality of inorganic particles is between about 100 nm and 1000 nm. In other embodiments, the largest dimension of the first plurality of inorganic particles is between about 1 µm and 100 µm. In one embodiment, the substrate is steel. In other embodiments, the substrate is selected from the group comprising iron, steel, platinum, gold, nickel, cobalt, copper, palladium, silicon, gallium arsenide, carbon black, carbon fiber, carbon nanotube and diamond. In certain embodiments, the material has a hydrophobic surface with a water contact angle of the substrate is greater than about 150°.

In another embodiment, a method of making a particle with a diazonium functional group includes providing a particle with an amine functional group, forming a particle with a carboxylic acid functional group from the particle with the amine functional group, forming a particle with an aniline functional group from the particle with the carboxylic acid functional group, and forming a particle with a diazonium functional group from the particle with the aniline functional group. In certain embodiments, the particle is selected from the group including silica, titania, and zirconia.

In one embodiment, a method of making a material includes providing a substrate, providing a first plurality of inorganic particles with a diazonium functional group, and attaching the first plurality of inorganic particles to the substrate. In some embodiments, the largest dimension of the first plurality of inorganic particles is between about 10 nm and 100 µm. In some embodiments, the substrate is selected from the group comprising iron, steel, platinum, gold, nickel, cobalt, copper, palladium, silicon, gallium arsenide, carbon black, carbon fiber, carbon nanotubes, and diamond.

In another embodiment, the method further includes providing a second plurality of inorganic particles with a phenol functional group and attaching the second plurality of inorganic particles to the first plurality of inorganic particles. One embodiment includes providing a plurality of fluorinated molecules and attaching the plurality of fluorinated molecules to the second plurality of inorganic particles. In some embodiments, the material has a hydrophobic surface with a water contact angle of the substrate is greater than about 150°. In one embodiment, the material is steel and has a superhydrophobic surface.

BRIEF DESCRIPTION OF THE DRAWINGS

FIG. 12 illustrates representative scanning electron microscope (SEM) images of one embodiment of diazonium functionalized nanoparticles np5 attached to gold surfaces via electroreduction of the diazonium functionality;

FIGS. 13A-13B illustrate representative SEM images of one embodiment of diazonium functionalize particles of two different sizes covalently attached to a steel surface; (14A) mean particle diameter of approximately 150 nm; (14B) mean particle diameter of about 1.4 μm;

FIG. 15 illustrates representative photo images measuring the contact angle of a clean steel surface and embodiments of hydrophobic steel surfaces treated with diazonium functionalized particles.

DETAILED DESCRIPTION OF CERTAIN EMBODIMENTS

Figure 1:
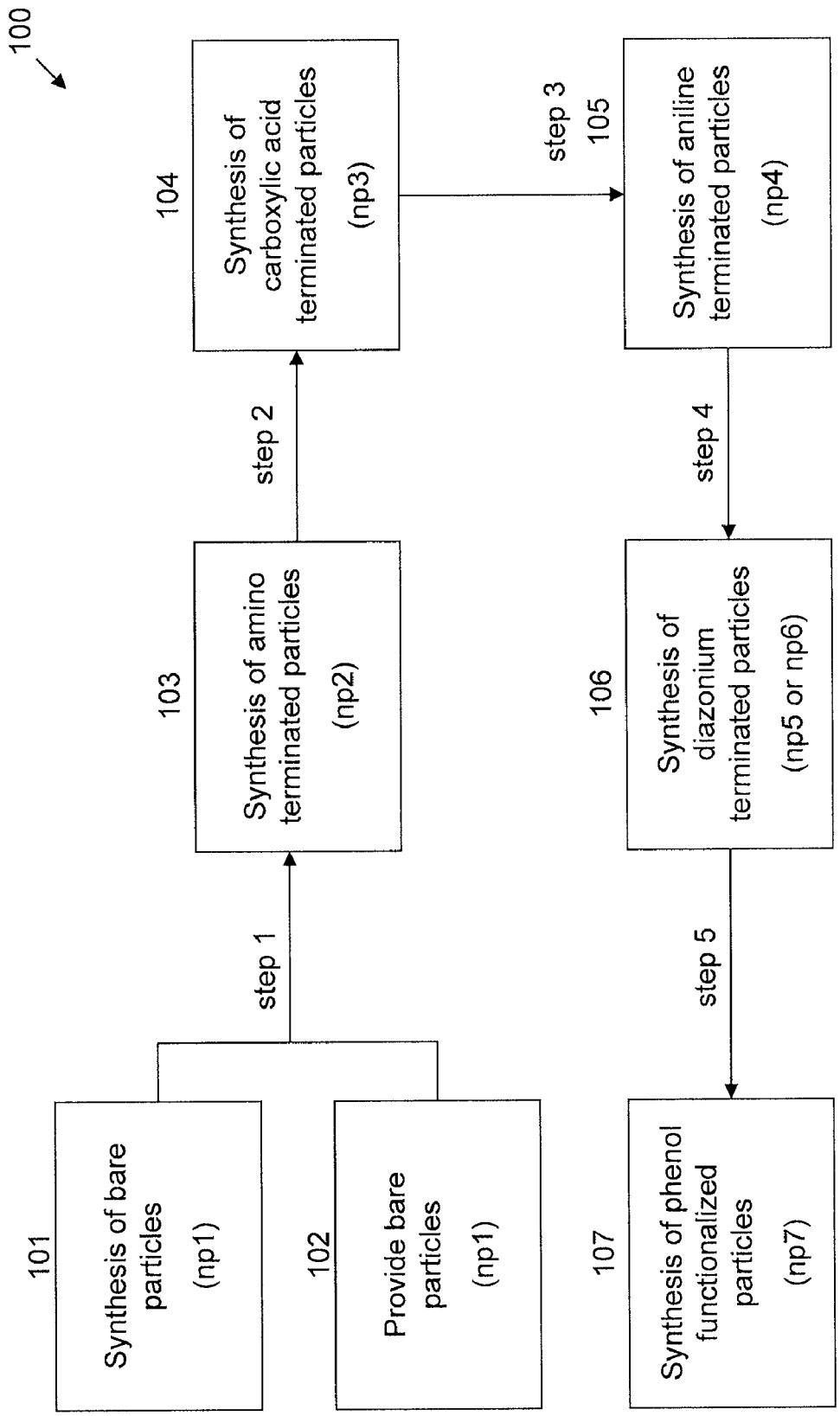
FIG. 1 illustrates an embodiment of a method of producing particles having varied functionalization np1 through np7; np1—bare silica particles; np2—amino-terminated silica particles; np3—carboxylic acid terminated silica particles; np4—aniline-terminated silica particles; np5—diazonium terminated silica nanoparticles; np6—diazonium terminated microparticles; np7—phenol functionalized particles.

Embodiments of the present disclosure provide systems and methods for the attachment of diazonium functionalized particles to substrates. Beneficially, such diazonium functionalized particles are suitable for attachment to substrates without modification of the substrate surface prior to attachment. In one embodiment, diazonium functionalized particles are attached to a substrate without separate surface modification of the substrate. In certain embodiments, the formation of diazonium functionalized particles of varying size, including, but not limited to, particles having mean diameters on the order of nanometers and microns, are discussed. Additional embodiments provide embodiments of the diazonium functionalized particles attached to surfaces.

A diazonium functional group has a structure of —R—N$_2^+$ where R can be any organic group and N is nitrogen. The R group can be a $C_6$-$C_{14}$ aromatic residue optionally functionalized with one or more substituents or a heteroaromatic residue of 5 to 14 atoms. The aromatic residue can also be optionally functionalized with one or more substituents including one or more heteroatoms selected from the group consisting of oxygen, nitrogen, sulphur and phosphorus. For diazonium functionalized particles, the R group is attached or bound to the particle. The R group can be bound to the particle covalently or by any other chemical bond.

In one embodiment, a reaction mechanism for attachment of diazonium functionalized particles to a surface involves the generation of an aryl radical, followed by the formation of a covalent bond between the aryl radical and the surface. Diazonium functionalized particles can be covalently bonded to many surfaces including, but not limited to, Au, Fe, C, Si, GaAs and Pd. In this manner, diazonium functionalized particles may be attached to substrate surfaces without modification of the substrate surfaces, reducing the complexity of the attachment process.

In certain embodiments, diazonium functionalized particles may be attached to substrates through electrodeposition mechanisms. Examples of substrates may include, but are not limited to, gold (Au), semiconductors, and carbon. In other embodiments, spontaneous grafting of diazonium functionalized particles, without any electrochemical assistance, is possible for some systems. In particular, diazonium functionalized particles can be spontaneously grafted to steels. This spontaneous grafting may be preformed on other materials, including, but not limited to, carbon, copper, iron and zinc, silicon gallium arsenide (GaAs), and palladium. Diazonium functionalized particles can generally be grafted on any material wherein the material has available electrons to bond with the diazonium functional group.

Advantageously, diazonium salts may be easily and rapidly prepared in one step from a wide range of anilines. Furthermore, the reduction may occur at low potentials within times that are on the order of seconds to minutes. Thus, this reaction mechanism may offer a simple and versatile way of modifying the surface of metals. Additionally, embodiments of this mechanism may provide high synthetic flexibility due to the large potential as a functionalization point, represented by the aromatic group that allows previous and/or posterior modifications. For example, after grafting the diazonium functionalized particle to the surface, aromatic functional groups remain on the surface. The aromatic moieties can be modified to provide a variety of new organic functionalities. Further advantages of embodiments of the present disclosure are discussed in detail below.

Figure 3:
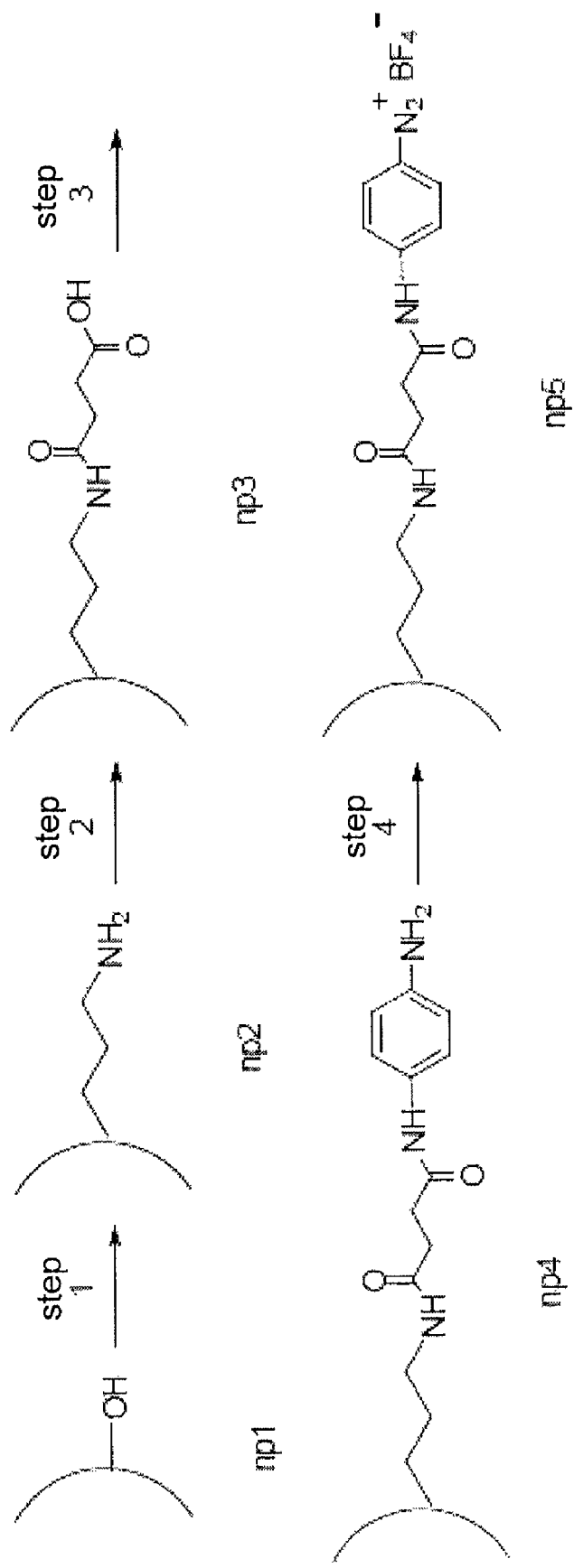
FIG. 3 illustrates one embodiment of a reaction route employed to synthesize diazonium functionalized particles.

FIG. 1 illustrates one embodiment of a method 100 of producing diazonium functionalized particles. FIG. 3 schematically illustrates embodiments of reactions occurring during the various operations of the method 100. In certain embodiments, the method 100 may include a plurality of chemical reactions in which particles having no functionalization or a variety of different functionalizations may be formed as intermediates in the process of generating diazonium functionalized particles. As discussed herein, intermediates having no functionality may be referred to as np1. Intermediates having amine, carboxylic acid, and aniline functionalizations may be referred to as np2, np3, and np4, respectively. It may be understood that these intermediate functionalizations represent embodiments of certain possible intermediate functionalizations but that other particles having intermediate functionalizations may also be employed.

The method 100 begins in block 101 or block 102, where particles are provided for functionalization. Embodiments of the particles can encompass a wide range of sizes and shapes, and can be chosen based on the application. In general, the range of the sizes of a particle that is functionalized with diazonium can range between a few atoms to a few meters. In certain embodiments, the largest dimension of the particle may range between about 10 nm to 100 μm. In other embodiments, the largest dimension of the particle may range between about 100 nm to 1000 nm. In further embodiments, the largest dimension of the particle may range between about 1 μm to 100 μm. In some embodiments, the largest dimension of the particle may range between 100 μm and 1000 μm. In even further embodiments, the largest dimension of the particle may be greater than 1000 μm. In addition, the particles can have a variety of shapes. For example, particles can be spherical, oblong, rods, plates, or etc. In certain embodiments, the particles may be inorganic particles. In other selected embodiments, the particles may be selected from the group consisting of: silica, titania and zirconia.

In certain embodiments, the particles may be approximately spherical. The mean diameter of the particles may range between about 10 nm and 1000 μm. In selected embodiments, the particles may comprise nanoparticles having a diameter that is less than about 100 nm. In other selected embodiments, the particles may comprise microparticles having a diameter that ranges between about 100 nm to 100 μm.

In certain embodiments, nano- and micro-scale particles, having amino-functionalization, also referred to as np2, may be synthesized in block 103 through a modified Stöber procedure. Embodiments of the Stöber procedure may be found in *J. Colloid Interface Sci.* 26, 62-69 (2004) and *J. Nanosci. Nanotech,* 4, 504-511, (2004) the entirety of each of which is hereby incorporated by reference.

In brief, the modified Stöber procedure may include mixing ammonia, $H_2O$, tetraethoxysilane (TEOS), aminopropyltriethoxysilane (APS) and ethanol to form a solution. The concentration of ammonia in the solution may range between about 1 and 3%. The $H_2O$ can be purified water, such as MILLI-Q™ (Millipore) $H_2O$ and range in concentration between about 0.5 and 2%. The concentration of the TEOS may range between about 1 and 5%. The concentration of ethanol may range between about 80 and 95%. In certain embodiments, the TEOS may be mixed with ethanol prior mixing with the ammonia and $H_2O$. After combination of the components of the mixture, the resulting solution can be agitated for a duration ranging between about 2 and 10 hrs. For example, the solution can be stirred. The agitation may be further preformed under an inert atmosphere, such as a nitrogen atmosphere. Subsequently, APS in a concentration of about 5 and 8% in ethanol may be added to the solution. The solution may then be allowed to react for a duration ranging between about 6 and 16 hrs.

After the reaction period, a selected amount of ammonia may be removed from the solution. In certain embodiments, the amount of ammonia removed from the solution may be selected such that the total volume of the solution ranges between about 5 and 20 ml. Ammonia may be removed from the solution by techniques that include, but are not limited to pressure evaporation.

The np2 amino-functionalized silica particles may be collected from solution and cleaned before use. In certain embodiments, the np2 particles can separated from the solution by centrifugation. Cleaning may be further performed by a process of washing with water and recollection by centrifugation.

Nano- and micro-scale particles may be produced by the above procedures. To produce micro-scale particles, the amount of TEOS should be greater than to produce nano-scale particles. In particular, the TEOS ranges between about 1 and 3% to produce nano-scale particles, while TEOS ranges between about 5 and 10% to produce micro-scale particles.

For comparison purposes, bare silica particles, np1, may also be provided. In an embodiment, the modified Stöber procedure discussed above may be employed to fabricate np1 particles by the omission of APS. In another embodiment, the bare particles can be provided from a supplier.

Carboxylic acid terminated particles, np3 may be fabricated from the amino terminated nanoparticles in block 104. In one embodiment, the np3 particles may be produced by mixing about 0.5 to 1.5 g of np2 particles with about 50 to 120 ml of tetrahydrofuran (THF) and about 120 to 300 mg of succinic anhydride to form a solution. For example, the np2 particles may be suspended within the THF, followed by addition of succinic anhydride. The solution can be agitated, for example, by stirring. The agitation can be preformed under an inert atmosphere such as a nitrogen atmosphere. After, the mixture may be allowed to precipitate over a duration of about 6 to 12 hrs, followed by collection and cleaning of the precipitate. In certain embodiments, the np3 particles can be collected by centrifuge. The solid np3 particles can be washed, for example, with ethanol.

To evaluate the particles, tests may be further performed to determine whether the amine functionality has been removed from the particles. For example, a ninhydrin test may be performed on np3 particles to verify the absence of amine particles.

The method illustrated in FIG. 1 may further include synthesis of aniline terminated particles np4 in block 105. In one embodiment, an aniline group may be added to np3 particles by an amide formation reaction of np3 with p-phenylenediamine. The carboxylic acid groups may be activated by the formation of an N-hydroxysuccinimidyl ester (NHS). In one embodiment, such activation may be performed by reaction of 1-(3-Dimethylaminopropyl)-3-ethylcarbodiimide hydrochloride (EDC), NHS, and N dimethylaminopyridine (DMAP) with np3 in a mixture of dichloromethane ($CH_2Cl_2$), N,N dimethylformamide (DMF). About 5 to 20 ml of dichloromethane is mixed with about 15 to 60 ml DMF and about 0.25 to 1 g of np3. Subsequently, 70 to 320 mg of 1-(3-Dimethylaminopropyl)-3-ethylcarbodiimide hydrochloride (EDC), 90 to 400 mg of NHS, and 5 to 10 mg of N-dimethylaminopyridine (DMAP) are added to the mixture. Subsequently, the mixture can be agitated, for example, by stirring. The agitation can be further performed in an inert atmosphere such as a nitrogen atmosphere for a duration ranging between about 30 min. and 3 hrs. Condensation of amine can be carried out in situ by adding p-phenylenediamine to the mixture in a concentration ranging between about 50 and 200 mg The mixture may be further agitated for a duration of about 10 to 16 hrs to complete the reaction. The resulting np4 particles can be collect by centrifuge, and the np4 particles can be cleaned with a solvent, for example, ethanol.

The method illustrated in FIG. 1 includes synthesizing diazonium terminated particles np5 (nanoparticles) or np6 (microparticles) in block 106 from the aniline-functionalized np4 particles. The procedure may be performed in accordance with that disclosed in Turk *J Chem,* 2003, 27, 539-544, the entirety of which is hereby incorporated by reference. In this process, the aniline functionalization of the np4 particles may be converted to its diazonium salt. It may be understood that the np5 and np6 particles are substantially the same, except for their size. Further, whether np5 or np6 particles are produced in block 106 will depend upon the size of the np4 particles.

In one embodiment, the np5 or np6 particles may be produced by partially dissolving about 100 to 300 mg of np4 particles in about 3 to 15 ml of ethanol. Subsequently, about 0.08 to 0.320 ml of $HBF_4$ is added and the mixture cooled to about 0 to 5° C. About 0.05 to 0.20 ml of isoamyl nitrite may be added to the solution, followed by agitation for a duration between about 30 to 120 min. The mixture can be agitated such as by stirring.

The np5 particles can be further precipitated with diethyl ether. About 10 to 30 ml of diethyl ether is added to the mixture and left to precipitate for a duration of about 5 to 15 min. The resulting np5 particles can be filtered to separate out the np5 particles. The np5 particles can be washed with, for example, diethyl ether.

As discussed in greater detail below, superhydrophobic surfaces may be formed by attachment of diazonium functionalized particles and phenol functionalized particles. Phenol functionalized particles for this purpose may be formed from the diazonium functionalized particles in block 107. In one embodiment, np7 particles may be produced by mixing np5 or np6 particles in a solution of sulfuric acid ethanol to form a mixture. In certain embodiments, the concentration of np5 or np6 particles ranges between about 1 and 10 mg/ml and the concentration of sulfuric acid ranges between about 3 and 10%. The mixture can be agitated, such as by stirring, to facilitate the reaction for a duration of about 30 to 60 min. The np7 particles can be collected by filtering the resultant mixture. The collected np7 particles can be washed, for example, with ethanol.

To verify the success of the reaction, tests may be performed to verify the presence of the phenol functionalization, as discussed in the Examples. For example, the np7 particles may be added to reagents such as a basic solution of 2-naftol or p-carboxydiazonium tetrafluoroborate. The color change of the 2-naftol upon addition of np7 particles may confirm the absence of the diazonium group, while the color change of the p-carboxydiazonium tetrafluoroborate may confirm the presence of the phenol group.

Figure 2A:
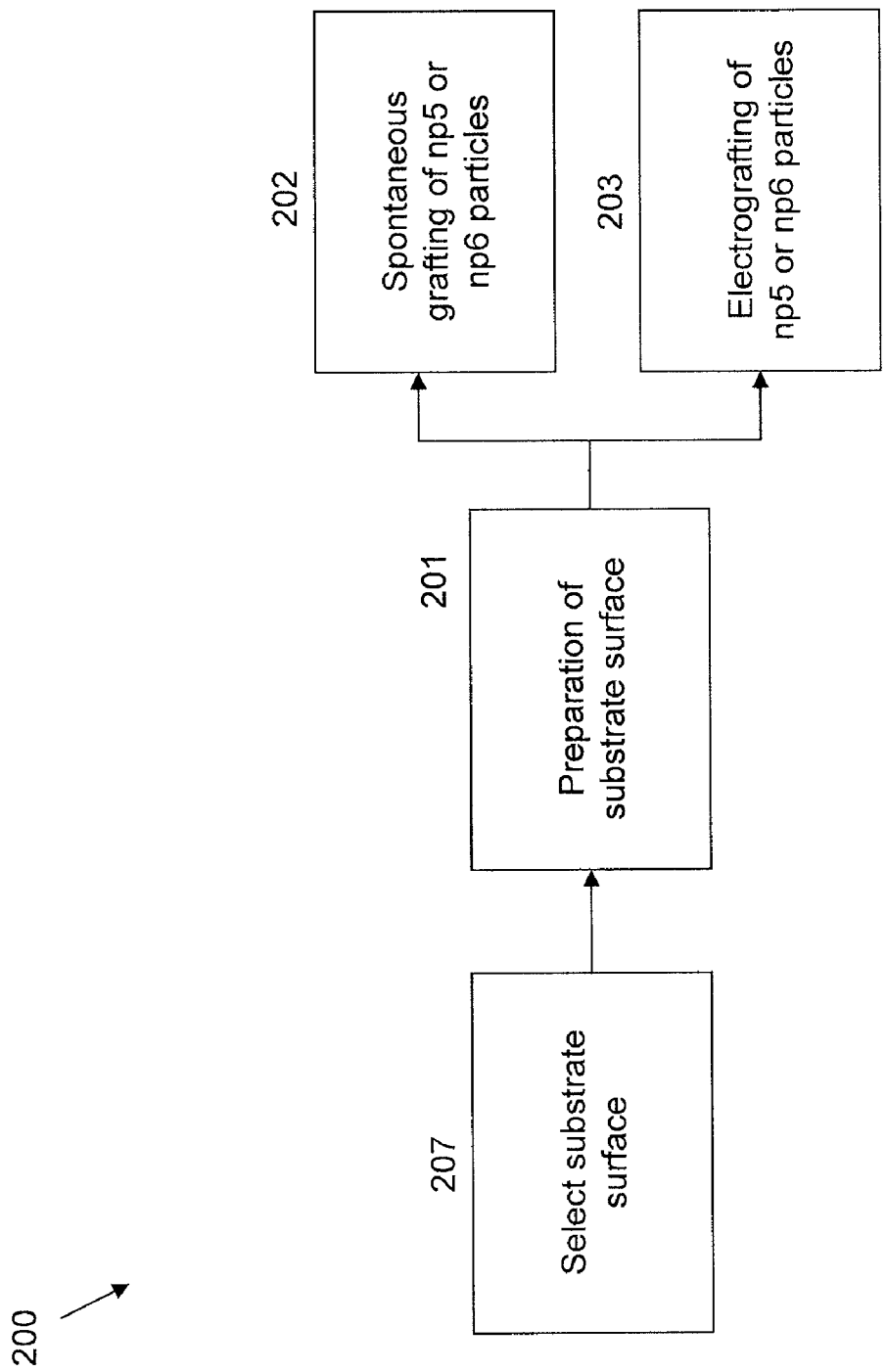
FIG. 2A illustrates an embodiment of a method of depositing diazonium functionalized particles onto a substrate surface.
Figure 2B:
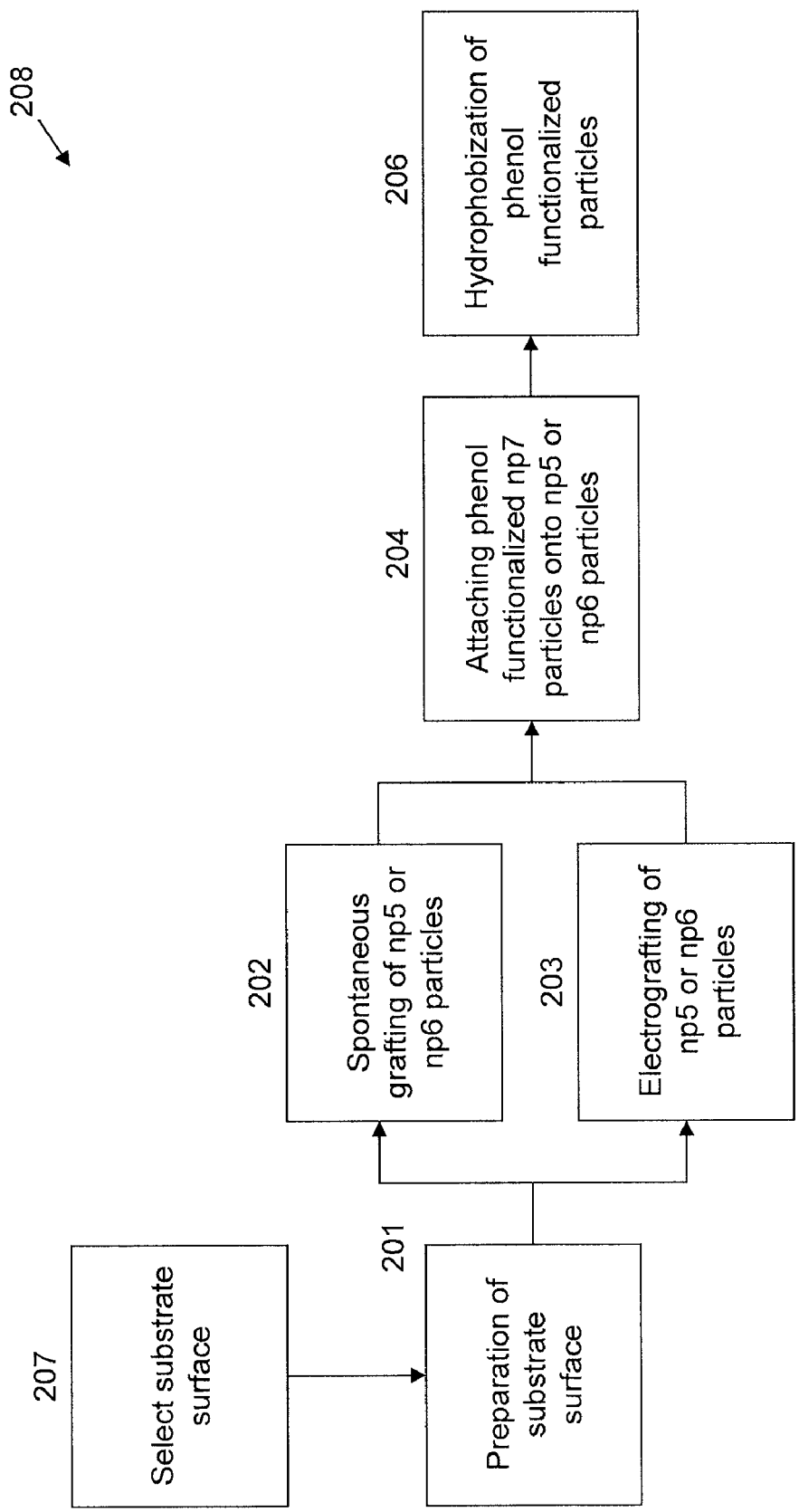
FIG. 2B illustrates an embodiment of a method of employing functionalized particles to impart hydrophobicity to a substrate surface.

The diazonium functionalized particles discussed above may be further attached to substrate surfaces. FIG. 2A illustrates one embodiment of a method 200 of depositing diazonium-functionalized particles onto a substrate surface. FIG. 2B illustrates a further method 208 for deposition of diazonium functionalized particles and phenol functionalized particles of varying size onto a surface in order to impart enhanced hydrophobicity to the surface. It may be understood that the operations discussed in methods 200 and 208 may be omitted or added to and that such operations may be rearranged in their order of execution, as necessary.

The method 200 illustrated in FIG. 2A includes selecting a substrate surface in block 207. In certain embodiments, the substrate may include classes of materials such as metals, semiconductors and carbon. In further embodiments, the substrate may comprise materials such as steel, gold, platinum, iron, zinc, nickel, cobalt, copper, palladium, silicon, gallium arsenide, carbon black, carbon fiber, diamond, carbon nanotubes.

The method 200 illustrated in FIG. 2A includes preparing a substrate surface in block 201. Preparing the substrate surface, before modifying the surface with diazonium functionalized particles, can improve attachment of the diazonium functionalized particles. In one embodiment, surface preparation may include polishing the surface to reduce the surface roughness to a selected level.

The surface can be polished by any method known in the art. For example, the surface can be polished by techniques including, but not limited to, etching, grinding, and sanding with abrasive papers, wheels, slurries, and combination thereof.

In other embodiments, substrate surface preparation may include surface cleaning in order to substantially remove contaminants from the surface. Cleaning can be performed using cleaning agents including, but not limited to, dichloromethane ($CH_2Cl_2$), acetone, sulfuric acid ($H_2SO_4$) and combinations thereof. In some embodiments, a mixture of dichloromethane and acetone may be employed to wash the substrate surface. In other embodiments, a gold surface can be electrochemically cleaned with $H_2SO_4$.

Some substrate surfaces are conducive to spontaneous grafting while other substrate surfaces may require electrografting to graft diazonium-functionalized particles. For example, carbon, copper, iron, zinc, silicon, gallium arsenide (GaAs) and palladium are suitable for spontaneous grafting of diazonium-functionalized particles. On the other hand, materials such as carbon, copper, iron, zinc, silicon, gallium arsenide (GaAs), palladium, gold and silicon may need to be electrografted for attachment to the substrate surface. Therefore, in certain embodiments, the method 200 may further include spontaneous grafting of diazonium-functionalized particles in block 202 or electrografting of diazonium-functionalized particles in block 203.

Spontaneous grafting of diazonium functionalized particles can be performed by placing diazonium functionalized particles in suspension. A surface may be placed into the suspension to enable the diazonium functionalized particles to graft to it.

Electrografting can be performed by using a suspension of diazonium-functionalized particles in an electrolyte. A working electrode and a counter electrode are placed into the electrolyte. An electrical potential is applied across the working electrode and the counter electrode to electroreduce the diazonium functionalized particles.

In one embodiment, spontaneous grafting may carried out in block 202 by introducing the substrate surface to a solution comprising diazonium functionalized particles. In one embodiment, solvents including acetonitrile and the supporting electrolyte tetrabutylammonium tetrafluoroborate ($(C_4H_{11})_4NBF_4$), and combinations thereof, can be used to form a solution of the diazonium functionalized particles. The concentration of particles within the solution may range between about 0.5 to 20 mg/ml.

In addition, the surface and/or the solution of diazonium functionalized particles can be agitated. Agitation can be done by shaking the surface and/or the solution of diazonium functionalized particles. Agitation can help prevent localized concentrations of particles and also promotes particle interaction with the surface.

In another embodiment, electrografting may be employed in block 203 to attach diazonium functionalized particles upon substrate surfaces. Electrografting may be performed by placing diazonium functionalized particles in suspension in an electrolyte. The substrate surface is placed in the electrolyte. A working electrode and a counter electrode are placed in the electrolyte and an electrical potential is applied across the two electrodes. The electrolyte and/or the substrate surface can be agitated. The electrolyte, working electrode and counter electrode may be chosen based on the substrate surface that is intended to have diazonium functionalized particles grafted to. A reference electrode may also be used to measure the electrical potential of the working electrode.

In certain embodiments, np5 or np6 diazonium functionalized particles may be electrografted to a gold surface by placing the gold substrate in a solution of about 5 to 20 ml of acetonitrile (ACN) and about 0.05 to 0.20 M of tetrabutylammonium tetrafluoroborate loaded with about 0.5 to 2 mg/ml of np5 or np6 particles. A gold working electrode, a platinum counter electrode, and an Ag/AgCl reference electrode can be used. An electrical potential of −1.5 to −1.0 V can be applied at temperatures of 15 to 30° C. for a duration of 10 to 60 min.

In an embodiment, depositing diazonium-functionalized particles on a substrate in blocks 202 and/or 203 can, advantageously, increase the hydrophobic properties of the substrate. For example, in one embodiment, depositing np5 or np6 particles on a surface may generally increase the hydrophobic properties of the surface that they are deposited on. In one embodiment, a water angle is greater than about 150°.

In further embodiments, superhydrophobic surfaces may be generated by the deposition of diazonium functionalized particles and phenol functionalized particles having different size scales. A method 208 of generating superhydrophobic surfaces is illustrated in FIG. 2B, beginning with preparation of the substrate surface in block 207 and proceeds with attachment of diazonium functionalized particles to the surface in blocks 202 and/or 203, as discussed above with respect to FIG. 2A. The method 208 illustrated in FIG. 2B may further include attaching phenol functionalized np7 particles onto diazonium functionalized particles in block 204 and reacting the phenol functionalized particles with one or more fluoro compounds in block 206.

Dual-size roughness featured topographic surface can improve hydrophobic properties of a surface. The coarse-scale rough structure may range between about 500 and 1500 nm, whereas the finer structure on top of the coarse structure may range between about 50 and 250 nm. In one embodiment, the coarse structure and fine structure is about 500 to 1000 nm and about 50 to 100 nm, respectively. In another embodiment, the coarse structure and fine structure is about 10 μm to 20 μm and about 100 nm to 1 μm, respectively. The dual-size structure can result in producing superhydrophobicity and low water roll off angles. In one embodiment, a water contact angle is greater than about 150°.

In an embodiment, a dual-size roughness featured topographic surface can be produced by depositing np6 microparticles on a surface in blocks 202 and/or 203, and depositing np7 nanoparticles on the np6 microparticles in block 204. The np7 nanoparticles can be attached to the np6 microparticles by immersing the surface in a mixture including np7 particles and solution of potassium hydroxide. The mixture can further include ethanol, and the concentration of the ethanol within the mixture may range between about 95 and 99%. The concentration of the potassium hydroxide within the mixture may range between about 0.01 and 0.10 M. The concentration of np 7 particles within the mixture may range between about 1 and 10%.

In one embodiment, the phenol-terminal functional groups are reacted with a fluoro-compound, such as perfluorododecanoic acid. In some embodiments, the fluoro-compound is a fluorinated organic molecule. The surface can be immersed into a solution of about 20 to 100 mg of perfluorododecanoic acid to fluorinate the phenol functionalized particles. The perfluorododecanoic acid can be activated by a reaction with about 10 to 30 mg of 1-(3-dimethylaminopropyl)-3-ethylcarbodiimide hydrochloride (EDC), about 5 to 20 mg of N-hydroxysuccinimide (NHS), and about 5 to 10 mg of N-dimethylaminopyridine (DMAP) for a duration ranging between about 5 to 20 min. Other embodiments include activating the perfluorododecanoic acid with other chemicals such as non-fluorinated acids containing hydrophobic groups (acetic, propionic, butiric, dodecanoic acid, etc), fluorinated acids (perfluorodecanoic, trifluoroacetic, etc), anhydrides (trifluoroacetic anhydride, etc), and acyl chlorides (trifluoroacetyl chloride, etc). In addition, the surface and/or solution can be agitated for a duration of about 1 to 24 hrs. For example, agitation can be done by shaking.

EXAMPLES

The following examples are provided to demonstrate the benefits of the embodiments of the disclosed diazonium functionalized particles and surfaces modified with diazonium functionalized particles. For example, as discussed below, diazonium functionalized particles may be easily and rapidly prepared and employed to modify surfaces in a simple and versatile ways. These examples are discussed for illustrative purposes and should not be construed to limit the scope of the disclosed embodiments.

In one embodiment, the following analytical grade chemicals were employed, as received from the manufacturer, in the fabrication of the surface-functionalized particles: tetraethoxysilane (TEOS, Acros), aminopropyltriethoxysilane (APS, Aldrich), p-phenylenediamine (Aldrich), tetrafluoroboronic acid (Aldrich), N-dimethylaminopyridine (DMAP, Fluka),1-(3-Dimethylaminopropyl)-3-ethylcarbodiimide hydrochloride (EDC, Fluka), succinic anhydride (Fluka), N-hydroxysuccinimide (NHS, Aldrich), and isoamyl nitrite (Sigma). Additionally, aqueous solutions were prepared with approximately 18 MΩ MILLI-Q™ (Millipore) water. Furthermore, percent concentration of reagents discussed herein are on the basis of g/100 ml, unless otherwise noted.

Example 1

Particle Synthesis

Embodiments of bare (np1) and amino terminated (np2) particles were synthesized through a modified Stöber procedure. A mixture of about 13.5 ml of ammonia (about 28%), about 1.5 ml of MILLI-Q™ $H_2O$, and about 6 ml of TEOS in about 200 ml of ethanol was stirred at about room temperature under nitrogen atmosphere for about 5 hrs. About 300 μl of APS in about 5 ml of ethanol was added to the mixture, and the mixture was left to react overnight. The temperature of the ethanol was about 18-24° C. The ammonia was removed by reduced pressure evaporation, and volume of the mixture was reduced to about 20 ml. The resulting amino terminated np2 particles were separated and cleaned by three cycles of washing with water. The np2 particles were recollected by centrifugation. In addition, np1 particles were synthesized under the same above conditions except that APS was not added. Ninhydrin tests of np2 and np1 were conducted. The test of np2 was positive which indicated the presence of amine groups. On the other hand, the Ninhydrin test of np1 was negative which indicated the absence of amine groups.

Embodiments of carboxylic acid terminated (np3) silica nanoparticles were fabricated through the following procedure. About 1.150 g of amino terminated np2 nanoparticles were suspended in about 90 ml of THF. About 250 mg of succinic anhydride was added and the mixture was stirred overnight at about room temperature under nitrogen atmosphere. The mixture was left to precipitate, then decanted and centrifuged to separate the solid from the mixture. The solid obtained was washed with ethanol to obtain np3. A ninhydrin test of np3 was negative, which indicated the absence of amine functions.

Embodiments of aniline terminated (np4) silica particles were fabricated through the following procedure. The aniline functional group was added by an amide formation reaction of np3 with p-phenylenediamine. Carboxylic acid groups were activated by formation of the N-hydroxysuccinimidyl ester. About 500 mg of np3 were suspended in a mixture of about 10 ml of $CH_2Cl_2$ and about 30 ml of DMF. About 155 mg of EDC, about 180 mg of NHS, and a catalytic amount of DMAP were added. The mixture was stirred for approximately an hour at room temperature under nitrogen atmosphere. Copulation with the aromatic group was carried out in situ by adding about 100 mg of p-phenylenediamine to the previous mixture. The new slurry was stirred overnight and np4 particles were subsequently separated by centrifugation and washed with ethanol.

Embodiments of diazonium salt terminated (np5) silica particles were fabricated through the following procedure. The aniline np4 was converted into its diazonium salt by partially dissolving about 220 mg of np4 in about 6.3 ml of ethanol. About 160 μl of $HBF_4$ was added and the mixture was cooled to approximately 5° C. in an ice water bath. About 94 μl of isoamyl nitrite was added and the mixture was stirred for approximately an hour. The np5 nanoparticles were precipitated with diethyl ether, filtered, and washed with diethyl ether.

To confirm the presence of diazonium groups, a sample of np5 was treated with β-napthol in about 0.1 M NaOH. The suspension turned a deep red color substantially immediately, which indicated positive presence of diazonium groups. The same procedure was repeated with a sample of np4 and yielded negative results.

Example 2

Particle Characterization

The np1 to np5 particles synthesized in Example 1 were examined using a variety of analytical techniques, including infrared spectroscopy, scanning electron microscopy, nuclear magnetic resonance, transmission electron microscopy, and dynamic light scattering.

Diffuse reflectance infrared Fourier transform (DRIFT) spectra of the nanoparticles were collected using a Nicolet 5700 FT-IR spectrometer (Nicolet Corporation) equipped with a cryogenic MCT-A detector and a diffuse reflectance accessory. Potassium bromide was employed as reference, and the spectra were collected with a spectral resolution of about 4 $cm^{-1}$ accumulating approximately 32 scans.

Figure 4:
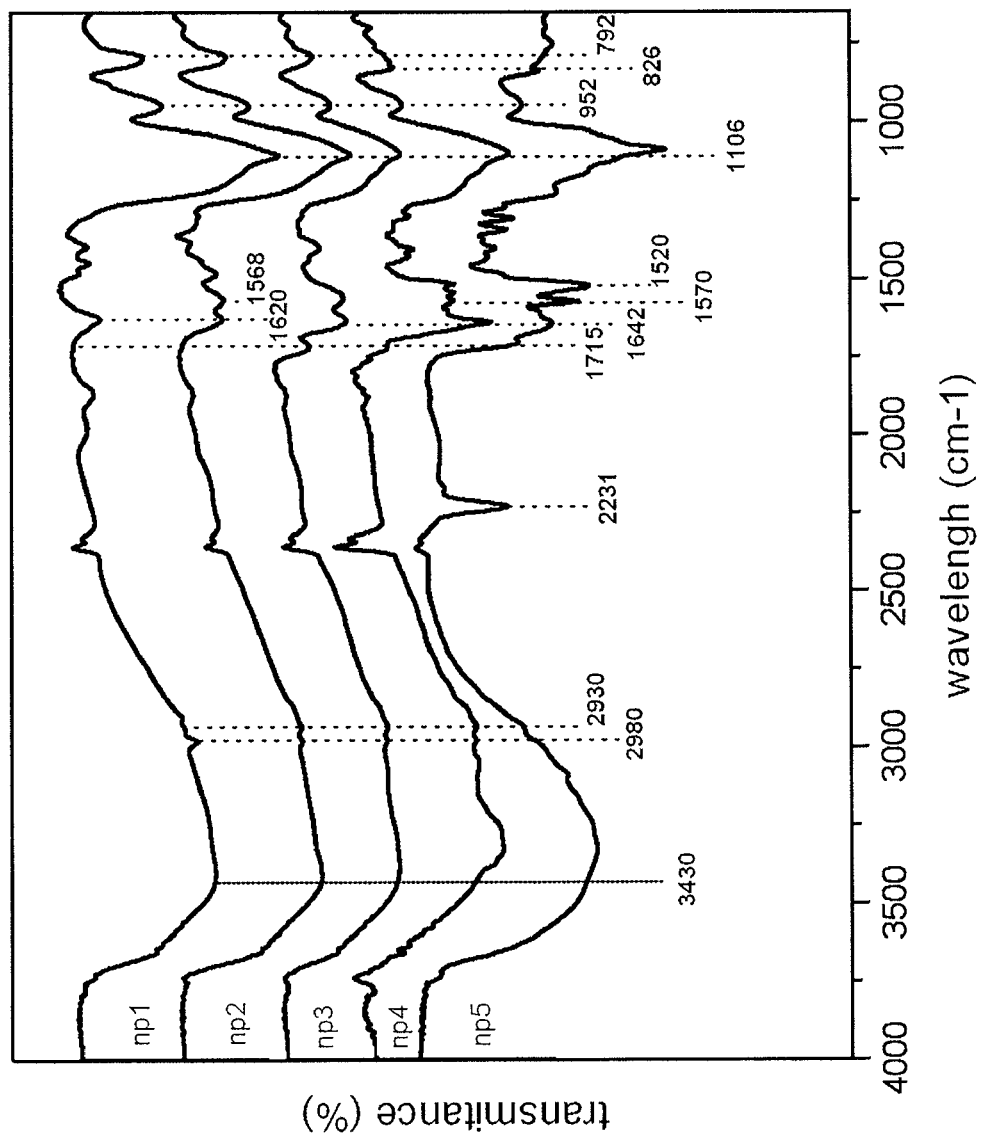
FIG. 4 illustrates diffuse reflectance infrared Fourier transform (DRIFT) spectra of nanoparticles over the wavelength range of about 4000 to 600 cm$^{-1}$ as a function of the reaction steps (np1 to np5) of FIG. 3.
Figure 5:
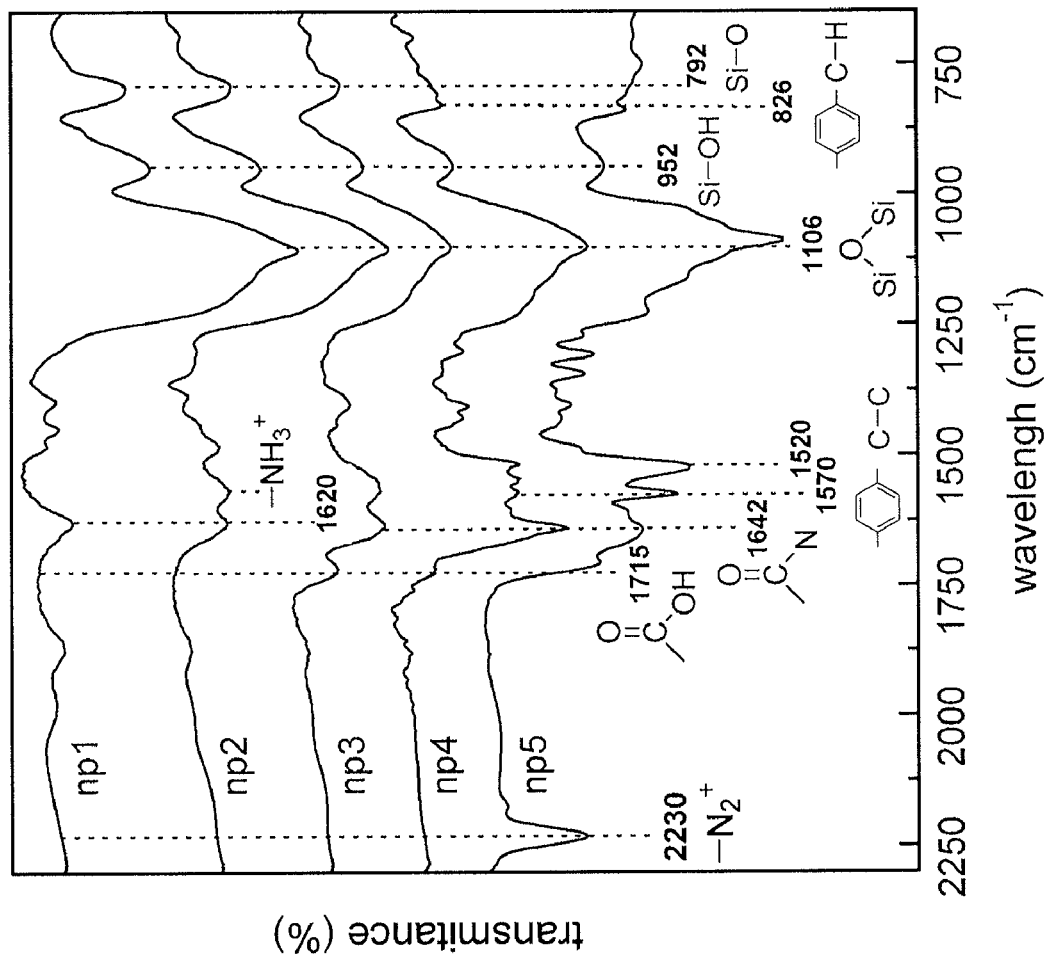
FIG. 5 is a portion of FIG. 2 over the wavelength range of about 2200 to 625 cm$^{-1}$ that illustrates DRIFT spectra of nanoparticles as a function of reaction steps (np1 to np5) of FIG. 3.

FIGS. 4 and 5 illustrate DRIFT spectra of embodiments of nanoparticle products np1 to np5. All spectra indicate peaks at approximately 3430 and 952 $cm^{-1}$ which correspond to Si—OH stretching and peaks at about 1106 and 792 $cm^{-1}$ which correspond to Si—O—Si and Si—O vibrations, respectively. C—H stretching vibrations for alkyl groups was observed in all measurements at about 2930 $cm^{-1}$. The presence of the C—H stretching in the case of the non-functionalized nanoparticles np1 indicates the presence of ethoxy groups and therefore, incomplete hydrolysis of TEOS during np1 synthesis. This supposition is further confirmed by the peak at about 2980 $cm^{-1}$. The peak at about 1620 $cm^{-1}$ may further be ascribed to adsorbed water and is found in spectra for np1 to np5.

The spectrum of aminopropyl functionalized nanoparticles np2 should have a peak corresponding to the N—H stretching at approximately 3200-3500 $cm^{-1}$. This peak was only slightly observable due to its overlap with the SiOH signal. Furthermore, a peak observed at about 1568 $cm^{-1}$ corresponds to the ammonium cation. This observation suggests that silanol surface groups can interact with amine groups to form zwitterions and to result in ammonium groups.

The spectrum of carboxyl-functionalized nanoparticles np3 shows two peaks due to the C=O stretching of carbonyl groups. The peak at about 1715 $cm^{-1}$ confirms the presence of the carboxylic acid functionality and the peak at about 1642 $cm^{-1}$, overlapping the adsorbed water signal, confirms the formation of amide bonds.

The DRIFT spectrum of aniline modified nanoparticles np4 shows a strong peak at about 1642 $cm^{-1}$. This peak, in line with the reduction of the about 1715 $cm^{-1}$ carboxylic peak, suggests the amidation of most of the carboxylic groups. The spectrum also suggests the presence of an aniline group with two peaks at about 1520 and 1570 $cm^{-1}$, which correspond to the aromatic C—C stretching vibrations. Furthermore, a peak is observed at about 826 $cm^{-1}$, which correspond to the C—H bending vibrations in the para-disubstituted aromatic group.

The spectrum corresponding to the diazonium-functionalized nanoparticles np5, illustrates a peak at about 2230 $cm^{-1}$ which is not present in any of the other spectra for np1 to np4. This peak at about 2230 $cm^{-1}$ corresponds to the stretching vibration of the diazonium —$N_2^+$ group. Furthermore, this peak indicates the success of the diazotation reaction. Additionally, peaks corresponding to the $BF_4$ group overlap with the Si—O—Si stretching vibration were observed at about 1106 $cm^{-1}$.

To summarize the above DRIFT spectrum analysis, FIGS. 4 and 5 illustrate the appearance and disappearance of the different organic functions from the surface of the nanoparticles as the reaction proceeds according to the reactions of FIG. 3. Therefore, the DRIFT data supports the reaction route outlined in FIG. 3, with subsequent (1) amine, (2) carboxylic acid, (3) aniline and (4) diazonium organic functional surface terminating silica nanoparticles. These observations are further confirmed by the XPS data discussed below.

Embodiments of nanoparticles np1 to np5 were analyzed with X-ray photoelectron spectroscopy (XPS). A Specs Sage 150 spectrometer equipped with a dual anode Mg/Al X-ray source and a hemispherical electron energy analyzer was employed. Spectra were acquired using an un-monochromatic MgKα source (approximately 1253.6 eV) operated at about 12.5 kV and about 14 mAmp with an approximately 90° detection angle and an approximately 0.79 $mm^2$ spot size. Quoted binding energies (BEs) are referred to the adventitious C 1$s$ emission at about 285 eV. Measurements conducted over powdered samples were made by placing a drop of a concentrated suspension of colloidal particles on a gold surface and drying in air. Atomic ratios were calculated from the integrated intensities of core levels after instrumental and photoionization cross-section corrections.

Broad XPS scans, illustrated in FIGS. 6A-6D, indicated the presence of Si, O, and C in all the np1 to np5 samples. Nanoparticles containing amine, amide or diazonium groups (np2 to np4) also indicated the presence of N. On the other hand, the diazonium salt np5 was the only sample indicated a signal for F and B.

Figure 6:
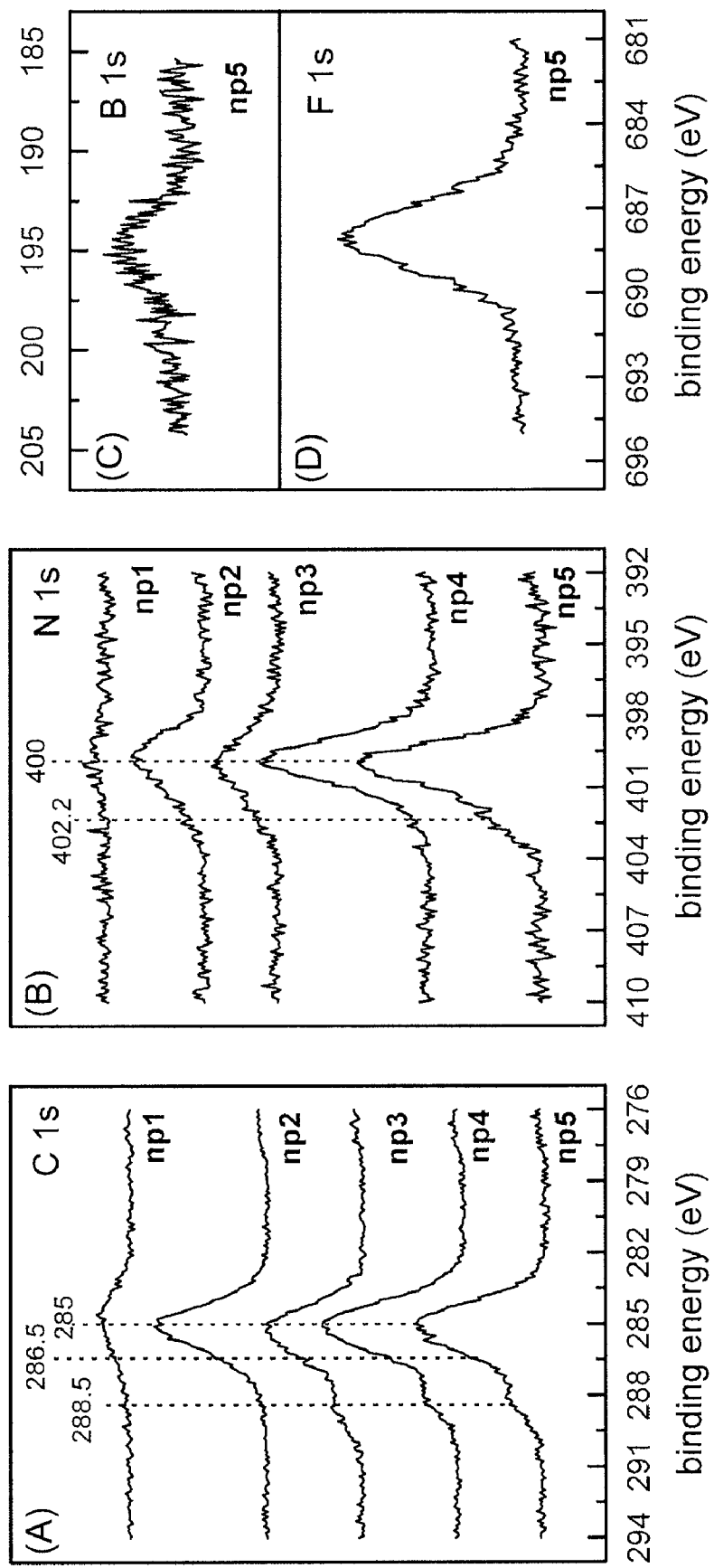
FIGS. 6A-6B illustrate X-ray photoelectron (XP) spectra as a function of reaction steps np1 to np5 of FIG. 3; (6A) C 1s spectra; (6B) N 1s spectra.
FIGS. 6C-6D illustrate X-ray photoelectron (XP) spectra for reaction step np5 of FIG. 3; (6C) B 1s spectra; (6D) F 1s spectra.

FIGS. 6A and 6B illustrate C 1$s$ and N 1$s$ XP spectra for reaction steps np1 to np5. FIGS. 6C and 6D illustrate B 1$s$ and F 1$s$ XP spectra for reaction step np5. As illustrated in FIG. 6A, C 1$s$ XP spectra illustrates three main contributions at about 285 eV, about 286.5 eV and about 288.5 eV corresponding to C—C bonds, C—N bonds, and X—C=O where X is N or O, respectively. A small C signal in the bare silica sample np1 was observed and was probably due to ethoxy groups and is consistent with the DRIFT results discussed above. As expected on the basis of the molecular structure of the propyl amine group, C 1s spectrum for np2 illustrates two signals at about 285 eV and about 286.5 eV. Carboxylated nanoparticles (np3) indicate a peak in the C 1s XP spectrum at about 288.5 eV due to the presence of amide group and a shoulder at about 289.1 eV due to the presence of the carboxylic group. This peak was also observed in reaction steps np4 and np5, which is consistent with the respective molecular structures.

Figure 7:
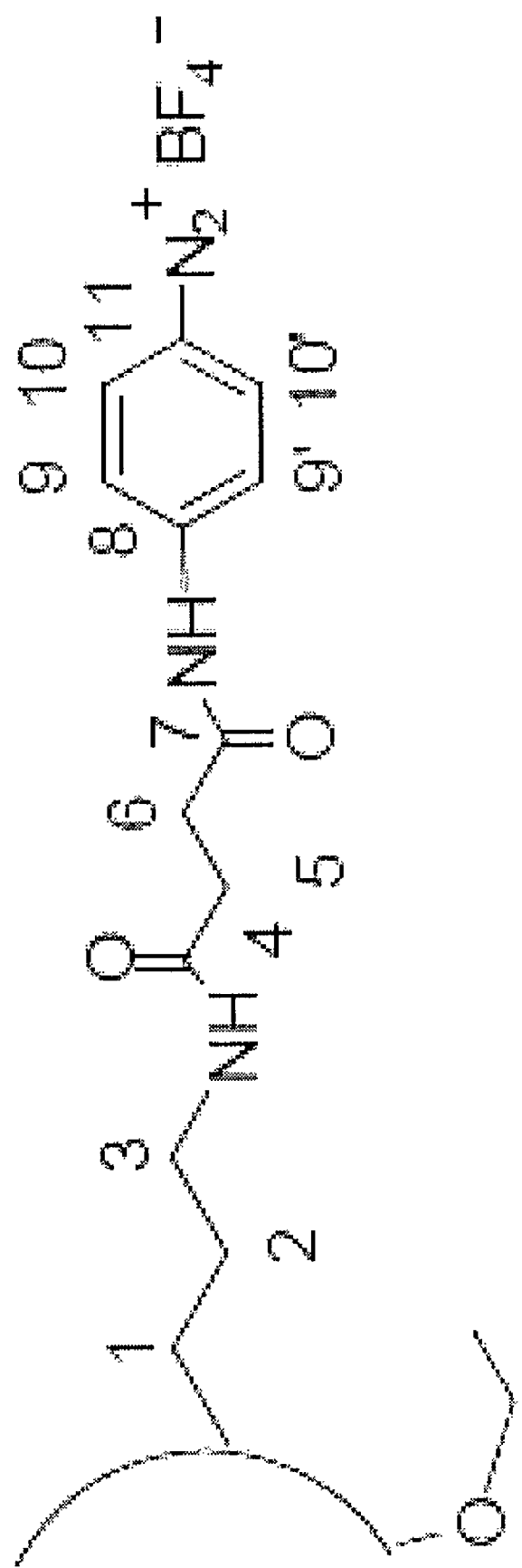
FIG. 7 illustrates one embodiment of a structure of diazonium functionalized particles np5.

As illustrated in FIG. 6B, silica nanoparticles (np1) show no signal in the N 1s region. The amino (np2) and carboxylic acid (np3) functionalized nanoparticles show a main N 1s peak at about 400 eV which is due to the amine and amide groups, respectively. A small peak at about 401.8 eV was also observed and was probably due to protonated amine groups, which is consistent with the approximately 1568 $cm^{-1}$ peak in the DRIFT measurement, as discussed above. Furthermore, the intensity of the N 1s signal remains approximately constant from np2 to np3 (step 2 in FIG. 3). Aniline functionalized nanoparticles np4 indicate an N 1s peak at about 400 eV due to the amide and aniline functionalities present on the nanoparticle. Furthermore, the N 1s integrated area under the curve in FIG. 6B for np4 is about 2.2 times larger than for np3. This difference suggests that step 3, where the carboxylic groups are amidation to yield the aniline functionality, is not complete. The spectrum of the diazotized nanoparticles np5 in FIG. 6B illustrates a peak at about 402.2 eV, which is not present for spectra for np1 to np4. The peak at about 402.2 eV is consistent with the presence of a diazonium group. This observation is consistent with the approximately 2231 $cm^{-1}$ peak in the np5 DRIFT spectrum, which also indicates the presence of the diazonium functionality. FIG. 7 illustrates one embodiment of diazonium salt np5.

B and F were only observed in the diazonium functionalized nanoparticles np5 and spectrums for B 1s and F 1s are illustrated in FIGS. 6C and 6D, respectively. The B 1s peak, at about 194.5 eV, and the F 1s peak, at about 688 eV, are consistent with the presence of $BF_4^-$ anion in np5. Furthermore the F/B ratio observed is approximately 3.8, which is consistent with an expected value of about 4.

The structure of one embodiment of the diazonium salt (np5) was analyzed by Cross Polarization Magic Angle Spinning $^1H$-$^{13}C$ Nuclear Magnetic Resonance (CPMAS NMR). Spectra were taken in a BRUKER MSL-300 spectrometer using a spinning speed of about 7000 Hz. The cross polarization contact time was about 2 ms and approximately 2400 scans were accumulated with an approximately 41 ms of acquisition time. The delay time between pulses was about 5 s, and the TPPM proton decoupling mode of the spectrometer was used.

The results of the $^{13}C$ CPMAS NMR are illustrated in Table I. Signals at about 18 and 60 ppm were assigned to carbon atoms from ethoxy groups that remain in the nanoparticle, which is consistent with the DRIFT and XPS measurements, as discussed above. Although small carbon signals due to ethoxy groups were observed in XPS measurements of bare silica np1, the corresponding peaks are clearly distinguished in $^{13}C$ CPMAS NMR. The difference in results of XPS and $^{13}C$ CPMAS NMR are expected due to the differences in the analyses. Specifically, while NMR measurements take in account the whole material studied, XPS measurements concern only the surface of the sample where a small number of ethoxy groups due to the grafting of APS groups are expected.

TABLE I

Assignment of 13C CPMAS NMR of diazonium functionalized nanoparticle np5

| NMR signal (ppm) | Assignment |
|---|---|
| 10 | C1 |
| 18 | $\underline{C}H_3CH_2O$ |
| 23 | C2 |
| 32 | C5, C6 |
| 43 | C3 |
| 60 | $CH_3\underline{C}H_2O$ |
| 109 | C11 |
| 124 | C9, C9' |
| 136 | C10, C10' |
| 141 | C8 |
| 175 | C4, C7 |
| 179 | C7* |

Signals due to the presence of both diazonium and carboxylic acid terminated groups were found. This observation indicates that the amidation of carboxylic groups to yield aniline (step 3) is incomplete and is in agreement with DRIFT and XPS measurements, discussed above. No differences are expected in the signals corresponding to C1 to C6 and they are discussed below.

The C1 peak was observed at about 10 ppm and is consistent with aminopropyl-bounded silica nanoparticles. A peak at about 32.4 ppm was assigned to C2. This C2 peak shows an upfield shift of about 4.2 ppm with respect to expected values for aminopropyl-bounded silica nanoparticles. The same shift was found for the analogous peak in the acetylation of butylamine. 32 and 43 ppm peaks were assigned to C2 and C3, despite the fact that they show an upfield shift with respect to analogous carbons in aminopropyl-bounded silica nanoparticles. This assignment was made because the same shift was observed in the acetylation of butylamine. The same behavior was also noticed for the C3 peak at about 42.8 ppm. Here, an approximately 5.1 ppm upfield shift was attributed to the formation of the amide bond. A peak at about 32 ppm was assigned to C5 and C6, which is consistent with values calculated for succinamide methylene carbons.

Two peaks can also be observed in the approximately 170-180 ppm zone of the spectrum. These signals, at about 175 and 179 ppm, are assigned to amide (C4, C7) and carboxylic acid (C7*) carbons, respectively. Amide and carboxylic carbon atoms have a similar behavior when pulsed for NMR measurements. Despite the difficulties in making a quantitative comparison between different functional groups with $^{13}C$ CPMAS NMR, in this particular case, it is believed that the bigger peak at approximately 174.6 ppm corresponds to a higher concentration of the specie. As a consequence, the coupling reaction between np3 and p-phenylenediamine qualitatively proceeded with a high conversion rate. This observation is consistent with DRIFT measurements discussed above.

Figure 8:
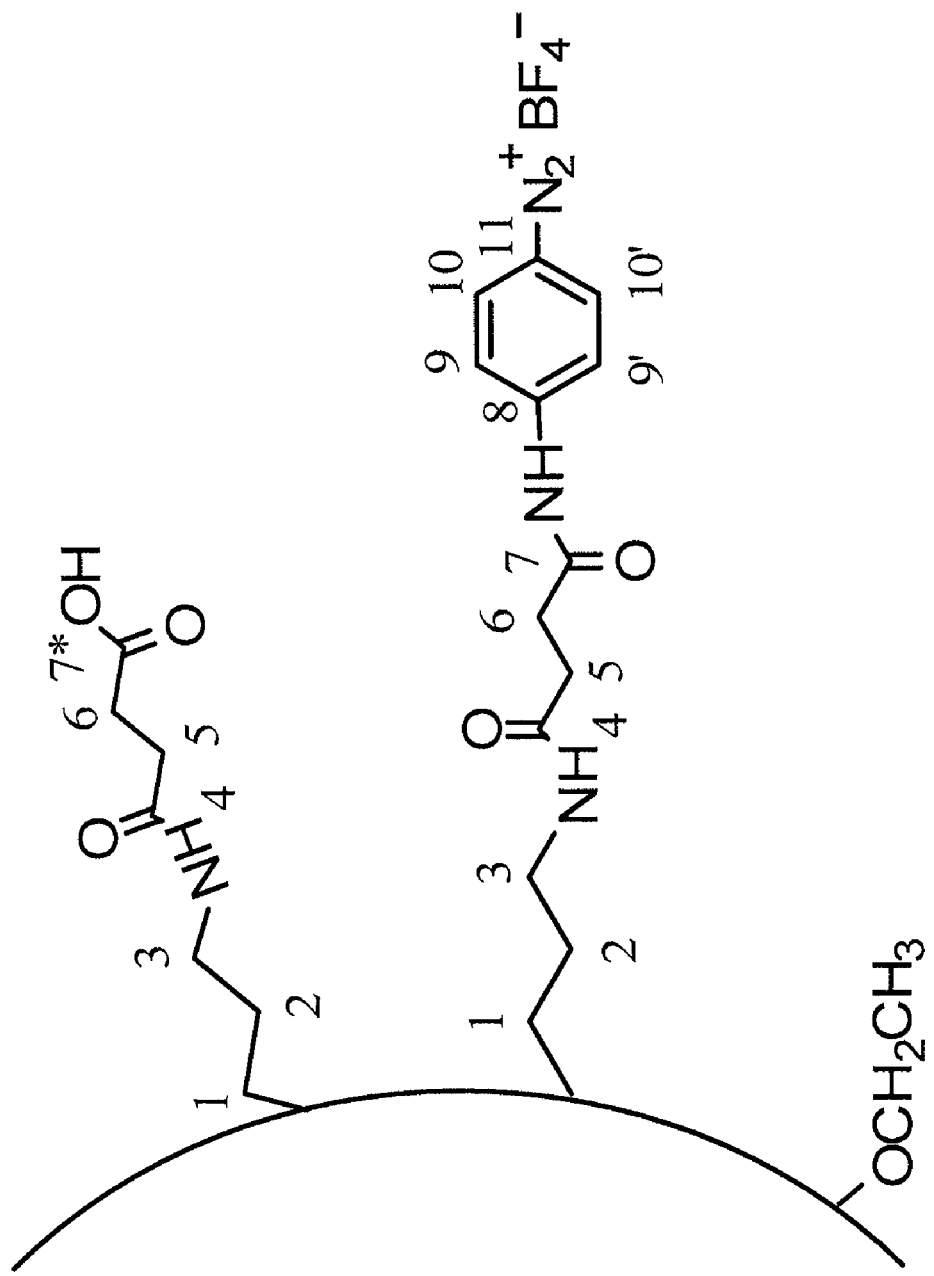
FIG. 8 illustrates one embodiment of a structure of diazonium functionalized particles np5.

Two broader signals were observed in the aromatic zone with maximums at about 124 and about 136 ppm, which is consistent with the calculated values for the diazonium salt of approximately 122 ppm for C9 and C9' and about 132 ppm for C10 and C10'. Calculation values for aromatic peaks of aniline np4 cannot be observed in the spectra. In particular, the peak corresponding to C10 and C10' at about 117 ppm was not observed. Although the aromatic signals appear with low definition, the apparent absence of unreacted aniline along with the results from XPS and DRIFT analyses, indicate the formation of the diazonium salt. This suggests that the diazotation reaction in step 4 is complete, and no aniline remains. DRIFT, XPS and NMR measurements indicate that the structure of np5 is close to one embodiment shown in FIG. 8 with a majority of surface groups comprising of diazonim surface groups.

The average particle size of one embodiment of the diazonium functionalized nanoparticles np5 was evaluated by SEM, TEM, and dynamic light scattering (DLS).

Transmission electron microscopy (TEM) observations were made using a Philips EM-301 TEM microscope. The TEM samples were prepared by placing a drop of diluted dispersion of nanoparticles in ethanol directly on a carbon-coated copper grid of approximately 200 mesh. Scanning electron microscopy (SEM) observations were made using a Philips XL-30 SEM microscope under an acceleration voltage of about 25 kV.

Particle size distribution was measured by DLS using a Brookhaven 90Plus analyzer. Samples consisted of very dilute suspensions, about 1 µg/ml, of nanoparticles in ethanol.

Figure 9:
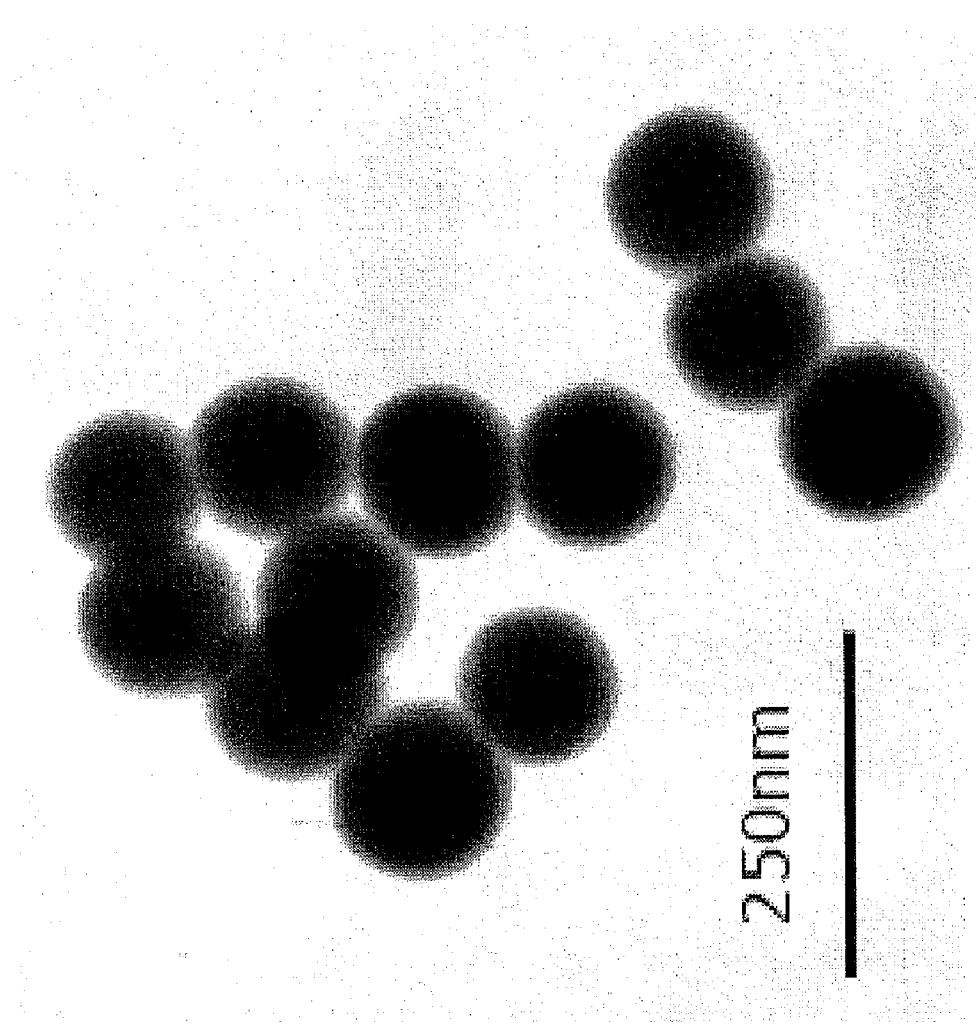
FIG. 9 is a transmission electron microscope (TEM) image of one embodiment of diazonium functionalized nanoparticles np5.

From the SEM images of the nanoparticles, an average nanoparticle diameter was approximately 134±12 nm. From TEM images as illustrated in FIG. 9, an average nanoparticle diameter was approximately 133±10 nm. DLS experiments measured an effective nanoparticle diameter of about 149±2 nm. Scattering and microscopy measurements measured different average particle sizes because DLS measures the hydrodynamic diameter which is larger than the geometric diameter of the particles. For example, DLS experiments require that nanoparticles be in solution and, as a result, their size is affected by the solvent, pH, and etc. In contrast, SEM and TEM experiments require dry samples which may not reproduce the particle distribution present in solution.

Example 3

Particle Attachment to Gold Substrates

Figure 10:
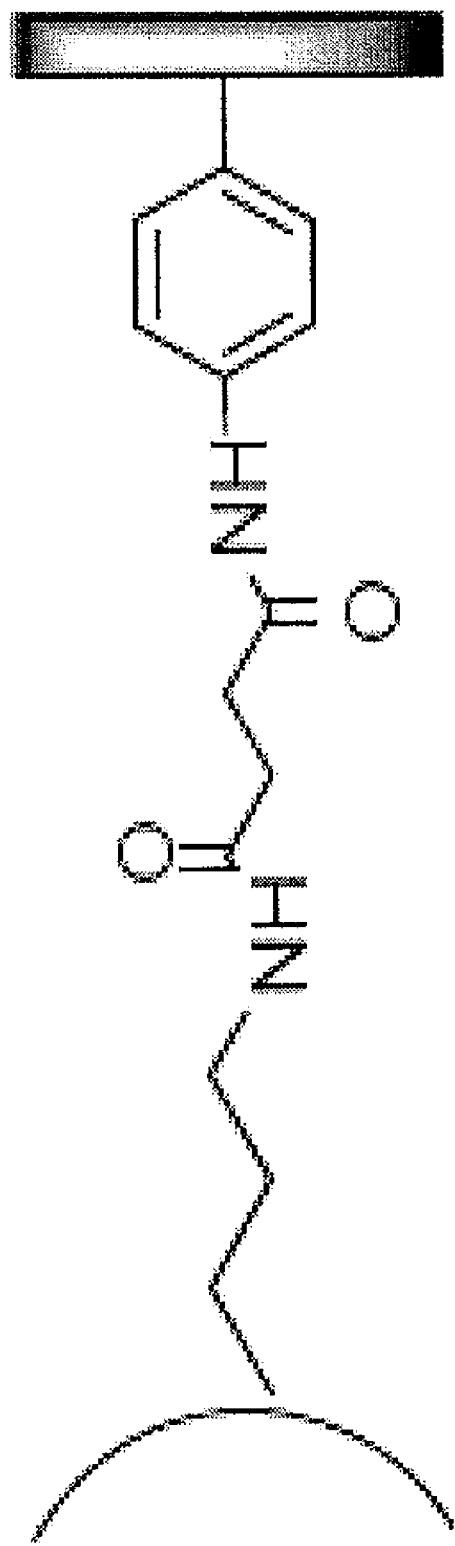
FIG. 10 is a schematic illustration of one embodiment of a diazonium functionalized particle covalently grafted over a surface.
Figure 11:
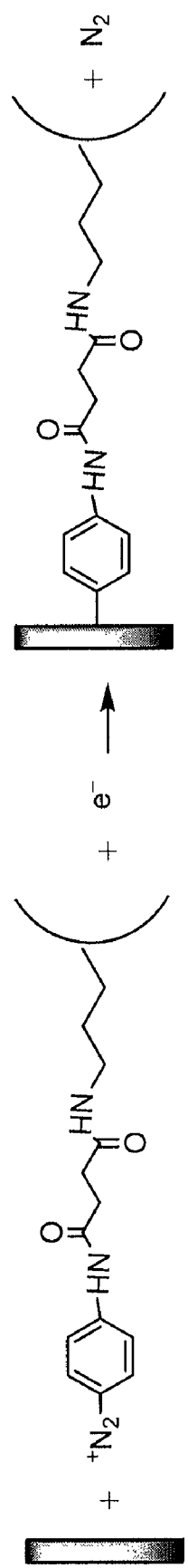
FIG. 11 illustrates one embodiment of a reaction route employed to covalently graft a diazonium functionalized particles over a surface.

In one embodiment, diazonium functionalized particles were electrodeposited over Au and steel surfaces following similar conditions as for electrografting of p-nitrobenzendiazonium tetrafluoroborate over Au surfaces and over steel surfaces. As illustrated by one embodiment in FIGS. 10 and 11, covalent attachment of diazonium salts to metal surfaces involves reduction of the diazonium functionality followed by surface attachment of the organic molecule.

Gold surfaces were prepared in the following manner for surface electrografting. Silicon (100) substrates were prepared by coating with an approximately 200 nm gold layer on an adhesion layer of about 20 nm titanium and about 20 nm palladium by thermal evaporation with an Edwards Auto 306 vacuum coating system. The coating was performed at a pressure (P) of approximately $P<1 \cdot 10^{-8}$ bar and the substrates were employed as electrodes. Au electrodes were cleaned in an ultrasonic bath with purified acetone and electrochemically cleaned in $H_2SO_4$, until a well-defined voltammetry was achieved. All electrochemical measurements were performed with an Autolab PGSTAT 30 potentiostat (Eco Chemie, Holland) using a purpose-built three-electrode cell. The cell comprised a gold working electrode, a platinum counter electrode, and an Ag/AgCl (about 3.0 M NaCl) reference electrode operated at room temperature.

Electroreduction of np5 nanoparticles over gold surfaces was carried out, in one embodiment, by applying a potential of approximately 0.3 V (vs. Ag/AgCl) for about 4000 s. Cyclic voltammetry measurements showed a peak at about 0.30 V (vs Ag/AgCl) due to the reduction of the diazonium salt. Electro-reduction of diazonium salt was carried out using a suspension of particles in ACN with a $NH_4BF_4$ supporting electrolyte. The concentration of $NH_4BF_4$ was approximately 0.1 M. Assuming a transfer of one electron per deposited nanoparticle, the measured current would imply the deposition of multiple layers of np5 over the Au electrode.

FIG. 12 illustrates SEM images of representative electrografted surfaces. In one embodiment, the gold surface was only partially covered with nanoparticles resulting in forming incomplete monolayers. When no voltage was applied to the Au electrode, no nanoparticle deposition over the substrate was observed. This observation confirms that the observed surface nanoparticles are electrodeposited over the Au surface.

The formation of a covalent bond between the functionalized nanoparticles and the metal was expected on the surface. Electrografted samples were subjected to exhaustive rinsing with acetone, isopropyl alcohol, $CH_2Cl_2$ and ethanol. In addition, electrografted samples were also sonicated in acetone and shaken overnight in a NaCl solution of approximately 5% NaCl. In all cases, no changes were observed in the SEM images and therefore, a strong bond was formed between the nanoparticle and the metal surface.

Some degree of nanoparticle coupling could be expected in the synthesis of np4 by reaction of amine moieties of p-phenylenediamine with acid groups of different nanoparticles. However, no changes were observed in the hydrodynamic average ratio and particle size distribution measured with DLS as a function of synthesis steps of np1 to np5. In addition, no multinomial particle size distribution (over about 7 days) was observed. Therefore, no nanoparticle coupling likely occurred.

Example 4

Particle Attachment to Steel Substrate

In additional embodiments, steel substrates were also surface modified by attachment of diazonium functionalized particles of varying size. Similar to above experiments, diazonium functionalized particles were deposited on steel surfaces by reduction of the diazonium functionality followed by surface attachment of the organic molecule.

Steel samples were prepared by polishing with a diamond slurry of approximately 1 µm, immersed in a $CH_2Cl_2$ acetone mixture having an approximately 1:1 ratio, and washed by sonication for about 5 min.

Diazonium functionalized microparticles (np6) were synthesized with a similar procedure as diazonium functionalized nanoparticles (np5). 6.25 ml of ammonia and 0.75 ml of water were added to 30 ml of absolute ethanol. A solution of 3 ml of TEOS in 13 ml of ethanol was added to the stirred solution during 1 hour by using a syringe pump. The solution was stirred for 14 hours at room temperature. 0.1 ml of APS was added and the suspension was left to react for 24 hours. The suspension was centrifuged and washed four times with ethanol to afford 1.4 µm amino-functionalized nanoparticles. Further functionalization steps as described above for np2 to np5 were used to produce np6 microparticles. SEM measurements indicated a monodispersed distribution of 1.4 µm diameter microparticles.

Diazonium functionalized particles were deposited over steel surfaces without electrochemical assistance by spontaneous grafting. Spontaneous grafting experiments were carried out by placing the steel samples horizontally on the bottom of an Erlenmeyer flask containing a suspension of about 1.5% of diazonium functionalized particles (np5) in acetonitrile. The sample was shaken in the acetonitrile suspension of diazonium functionalized for about 10 min, and a total current of about 1.49 mC was measured. Electrografting experiments were also carried out by applying a potential of about 1.0 V (vs. Ag/AgCl) for about 500 s.

FIG. 13 illustrates representative SEM images for the deposition of diazonium particles of different diameters (a) about 150 nm (np5) and (b) about 1.4 μm (np6). In both cases, a homogeneous surface coverage with a very small tendency for particles to form clusters was observed. Formation of a covalent bond between the functionalized particles and the metal surfaces was expected. Steel samples were subjected to exhaustive rinsing with acetone, isopropyl alcohol, $CH_2Cl_2$ and ethanol after deposition of the diazonium functionalized particles. The steel samples were also sonicated in acetone and shaken overnight in a 5% NaCl solution. For all the steel samples, no changes were observed from SEM imaging after rinsing or sonicating. Therefore, a sufficiently strong bond was formed between the nanoparticles or microparticles and the steel surface.

Example 5

Fabrication of Superhydrophobic Surfaces

In one embodiment, diazonium functionalized nanoparticles and microparticles were synthesized and used to impart superhydrophobicity to steel. A dual-size roughness topographic surface was made with np6 microparticles and np7 nanoparticles. The superhydrophobic surface over steel was produced by depositing diazonium functionalized microparticles (np6) over a steel surface, depositing phenol functionalized nanoparticles (np7) on the np6, and reacting np7 with a fluoro polymer.

Phenol functionalized nanoparticles (np7) were synthesized by the following procedure, in one embodiment. Diazonium functionalized nanoparticles (np5) were suspended in a 10% solution of sulfuric acid in absolute ethanol and stirred for 50 min. The suspension was filtered and washed with ethanol to produce np7 nanoparticles. To verify the success of the reaction, different nanoparticle samples were tested with a basic solution of 2-naftol and also a basic solution of 2-naftol with p-carboxydiazonium tetrafluoroborate. No color changes were noticed in the solution without p-carboxydiazonium tetrafluoroborate. On the other hand, a strong color change to deep red was observed for the solution with p-carboxydiazonium tetrafluoroborate. These results confirm the absence of the diazonium group and the presence of the phenol group.

A clean steel surface was dipped into a suspension of about 4 mg/ml np6 in deaerated acetonitrile and shaken for 10 minutes at 160 rpm. The surface was then rinsed with acetone, sonicated 20 minutes in isopropanol, and dried with a nitrogen stream. The surface was immersed into a solution containing np7 nanoparticles suspended in 5 ml of absolute ethanol containing 5 drops of 0.06 M potassium hydroxide. Hydrophobization was performed by reacting phenol-terminal functional groups of the np7 nanoparticles and perfluorododecanoic acid. Perfluorododecanoic acid was activated by reaction with EDC, NHS and DMAP. About 46 mg (0.075 mmols) of perfluorododecanoic acid were added to a solution containing about 17.4 mg of EDC, about 10.3 mg of NHS, and a catalytic amount of DMAP in about 3 ml of dichloromethane. The solution was stirred for about 30 minutes. The steel surface was dipped into the solution and shaken for about 90 minutes at about 160 rpm. The surface was rinsed with fresh dichloromethane, ethanol, and water and dried with a nitrogen stream.

Figure 14:
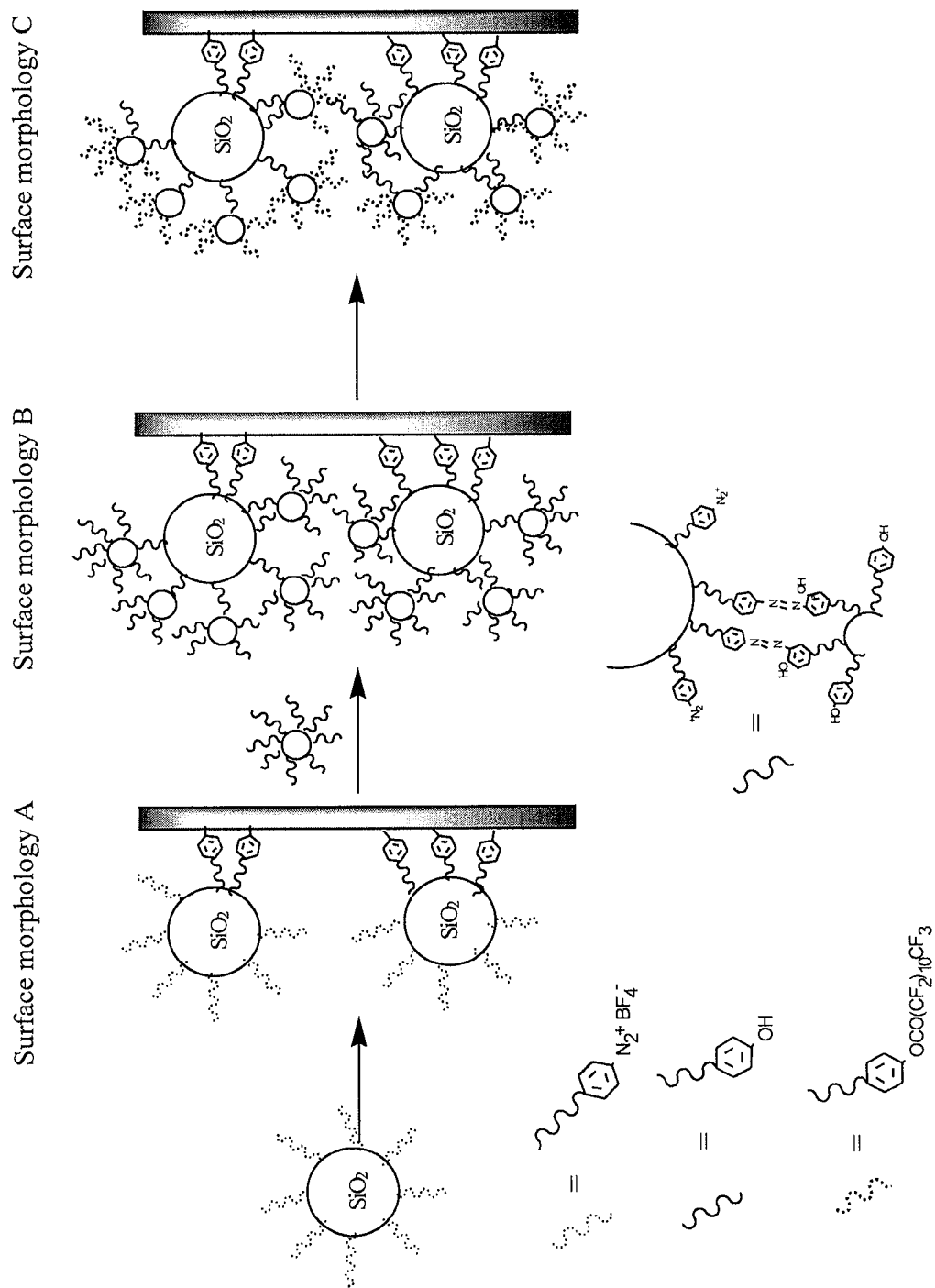
FIG. 14 illustrates one embodiment of a reaction route employed for the co-deposition of diazonium functionalized particles over a surface so as to impart super-hydrophobicity to the surface.

Embodiments of surface morphologies are illustrated in FIG. 14. As illustrated in FIG. 14 by surface morphology A, diazonium functionalized microparticles (np6) are deposited on a steel surface. Phenol functionalized nanoparticles (np7) are deposited on the diazonium functionalized microparticles (np6), as illustrated by surface morphology B in FIG. 14. As illustrated in FIG. 14 by surface morphology C, the phenol functional groups are reacted with a fluorinated molecule. The result is the creation of a dual surface morphology. Measured hydrophobic properties of the surface morphologies A to C are discussed below.

FIG. 15 illustrates water contact angle (CA) measurements for clean steel surface, surface morphology A, and surface morphology C. The clean steel surface had a CA of about 22° and surface morphology A had a CA of about 70°. The increase in CA indicated that the configuration of surface morphology A increased the hydrophobic properties of the steel surface. Two separate steel surfaces were produced with surface morphology C, and illustrated in FIG. 15 as samples 3 and 4. The CA for samples 3 and 4 were 155° and 163°, respectively. The hydrophobic properties increased even further than for surface morphology A. The dual-size structure of surface morphology C resulted in a superhydrophobic steel surface with improved hydrophobic properties compared to bare steel and surface morphology A.

Creating a hydrophobic surface is not limited to surface morphology A and C. The hydrophobic properties can be improved using various morphologies. In one embodiment, surface morphology B in FIG. 14 could be used which has dual-size particles but without a fluoro treatment. In another embodiment, a surface morphology is produced with a surface morphology similar to surface morphology A, however, nanoparticles can be used. In certain embodiments, other hydrophobic treatments to the particles can be used other than fluoro treatment such as attaching long chain, linear or branched alkylic moieties.

In summary, a new systems and methods for binding nanoparticles to metal surfaces has been discovered. In particular, diazonium functionalized silica nanoparticles were synthesized and covalently bonded to steel and gold surfaces by reduction of the diazonium functionality. As no prior metal functionalization is necessary in this method, it represents a significant advance over previously developed techniques. In addition, these methods were used to co-deposit nano and micro diazonium functionalized particles over steel surfaces to create a dual surface roughness that when made hydrophobic resulted in a superhydrophobic steel surface.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings.

What is claimed is:
1. A functionalized particle comprising:
an inorganic particle; and
a diazonium functional group having the formula

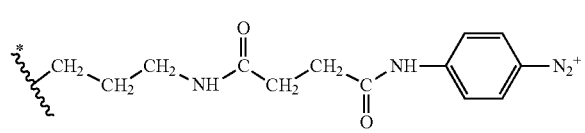

wherein * indicates attachment to the inorganic particle.

2. The functionalized particle of claim 1, wherein the inorganic particle is selected from the group consisting of silica, titania and zirconia.

3. The functionalized particle of claim 1, wherein the shape of the inorganic particle is selected from the group consisting of spheres, rods, tubes, oblong, and plates.

4. The functionalized particle of claim 1, wherein a largest dimension of the inorganic particle is in the range between about 10 nm and 100 µm.

5. The functionalized particle of claim 4, wherein a largest dimension of the inorganic particle is between about 100 nm and 1000 nm.

6. The functionalized particle of claim 4, wherein a largest dimension of the inorganic particle is between about 1 µm and 100 µm.

7. A material comprising:
a substrate; and
a first plurality of inorganic particles functionalized with at least one diazonium functional group, the at least one diazonium functional group attached by reduction of the diazonium functional group to the substrate;
wherein the at least one diazonium functional group has the formula:

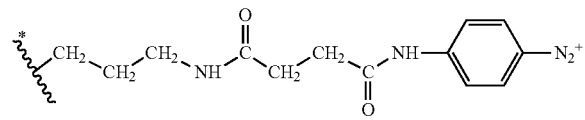

wherein * indicates attachment to an inorganic particle of the first plurality of inorganic particles.

8. The material of claim 7, wherein the first plurality of inorganic particles are selected from the group consisting of silica, titania and zirconia.

9. The material of claim 7, wherein the substrate is selected from the group consisting of metals, semiconductors, and carbon.

10. The material of claim 7, wherein the substrate is selected from the group consisting of iron, steel, platinum, gold, nickel, cobalt, copper, palladium, silicon, gallium arsenide, carbon black, carbon fiber, carbon nanotube and diamond.

11. The material of claim 7, wherein the largest dimension of the first plurality of inorganic particles ranges between about 10 nm and 100 µm.

12. The material of claim 7, wherein the largest dimension of the first plurality of inorganic particles is between about 100 nm and 1000 nm.

13. The material of claim 7, wherein the largest dimension of the first plurality of inorganic particles is between about 1 µm and 100 µm.

14. The material of claim 7, wherein the attachment of the first plurality of inorganic particles to the substrate is by covalent bonding.

15. The material of claim 7, wherein an aryl radical of at least one diazonium functional group is covalently bonded to the substrate.

16. The material of claim 7, wherein the substrate surface is not modified prior to the attachment of the first plurality of inorganic particles to the substrate.

17. The material of claim 7, wherein the material has a hydrophobic surface with a water contact angle greater than about 150°.

18. The material of claim 7, wherein the substrate is steel, the first plurality of inorganic particles are covalently attached to the substrate, the largest dimension of the first plurality of inorganic particles is between about 10 nm and 100 µm, and the first plurality of inorganic particles are silica.

19. The material of claim 7, wherein the substrate is selected from the group consisting of iron, steel, platinum, gold, copper, palladium, silicon, gallium arsenide, and carbon.

20. The material of claim 7, further comprising a second plurality of particles functionalized with a phenol functional group, the phenol functional group having a phenol attached to an organic group, the organic group attached to a particle of the second plurality of particles, and a carbon of the phenol attached to the at least one diazonium functional group of a particle of the first plurality of inorganic particles.

21. The material of claim 20, wherein the largest dimension of the first plurality of inorganic particles is between about 1 µm and 20 µm and the largest dimension of the second plurality of particles is between about 100 nm and 1000 nm.

22. The material of claim 20, wherein the first plurality of inorganic particles is interposed between the substrate and the second plurality of particles.

23. The material of claim 20, further comprising a fluorinated functional group attached to the second plurality of inorganic particles.

24. The material of claim 23, wherein the material has a hydrophobic surface with a water contact angle greater than about 150°.

* * * * *

UNITED STATES PATENT AND TRADEMARK OFFICE
CERTIFICATE OF CORRECTION

PATENT NO. : 8,236,422 B2  
APPLICATION NO. : 12/330378  
DATED : August 7, 2012  
INVENTOR(S) : Williams et al.

Page 1 of 1

It is certified that error appears in the above-identified patent and that said Letters Patent is hereby corrected as shown below:

Title Page, item [57] Abstract at line 1, Change "a n" to --an--.

In the Drawings:

Sheet 5 of 16 (FIG.4) at line 1 (x-axis), Change "wavelengh" to --wavelength--.

Sheet 5 of 16 (FIG.4) at line 1 (x-axis), Change "transmitance" to --transmittance--.

Sheet 6 of 16 (FIG.5) at line 1 (x-axis), Change "wavelengh" to --wavelength--.

Sheet 6 of 16 (FIG.5) at line 1 (x-axis), Change "transmitance" to --transmittance--.

In the Specifications:

In column 6 at line 56, After "mg" insert --.--.

In column 9 at line 55, Change "np 7" to --np7--.

In column 9 at line 64-65, Change "ethylcarbodimide" to --ethylcarbodiimide--.

In column 10 at line 4, Change "butiric," to --butyric,--.

In column 10 at line 41, Change "(npl)" to --(np1)--.

In column 10 at line 56, Change "npl" to --np1--.

In column 10 at line 58, Change "npl" to --np1--.

In column 11 at line 30, Change "β-napthol" to --β-naphthol--.

In column 12 at line 28, Change "diazotation" to --diazotization--.

In column 14 at line 65-66, Change "diazotation" to --diazotization--.

In column 15 at line 2, Change "diazonim" to --diazonium--.

In column 15 at line 38-39, Change "p-nitrobenzendiazonium" to --p-nitrobenzenediazonium--.

Signed and Sealed this  
Thirtieth Day of April, 2013

Teresa Stanek Rea  
*Acting Director of the United States Patent and Trademark Office*